(12) United States Patent
Yu

(10) Patent No.: US 11,930,493 B2
(45) Date of Patent: Mar. 12, 2024

(54) METHOD FOR INDICATING UPLINK PARAMETER OF PPDU AND RELATED APPARATUS

(71) Applicant: HUAWEI TECHNOLOGIES CO., LTD., Guangdong (CN)

(72) Inventor: Jian Yu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/172,105

(22) Filed: Feb. 21, 2023

(65) Prior Publication Data
US 2023/0209539 A1      Jun. 29, 2023

Related U.S. Application Data

(63) Continuation of application No. PCT/CN2021/113629, filed on Aug. 19, 2021.

(30) Foreign Application Priority Data

Aug. 21, 2020   (CN) .......................... 202010852462.1

(51) Int. Cl.
*H04W 72/1268*   (2023.01)
*H04L 1/00*   (2006.01)

(52) U.S. Cl.
CPC ....... *H04W 72/1268* (2013.01); *H04L 1/0003* (2013.01)

(58) Field of Classification Search
CPC ......... H04W 72/1268; H04W 72/0453; H04W 48/16; H04W 74/002; H04W 72/0446;
(Continued)

(56) References Cited

U.S. PATENT DOCUMENTS

2018/0146426 A1   5/2018   Park
2019/0097850 A1   3/2019   Kenney et al.
(Continued)

FOREIGN PATENT DOCUMENTS

CN   106797278 A   5/2017
CN   106879070 A   6/2017
(Continued)

OTHER PUBLICATIONS

Deng et al., "IEEE 802.11be-Wi-Fi 7: New Challenges and Opportunities," Aug. 3, 2020, arXiv:2007.13401v3, 30 pages.
(Continued)

*Primary Examiner* — Walli Z Butt
(74) *Attorney, Agent, or Firm* — Fish & Richardson P.C.

(57) ABSTRACT

This application relates to the wireless communications field, is applied to, for example, a wireless local area network supporting the 802.11 be standard Methods and apparatuses for indicating an uplink parameter of a physical layer protocol data unit (PPDU) are described. In an example method, an access point (AP) generates and sends a trigger frame, where the trigger frame includes an uplink length field. The uplink length field is used to indicate lengths indicated by legacy signal (L-SIG) fields in a high efficient trigger based (HE TB) PPDU and an extremely high throughput (EHT) PPDU, or the uplink length field is used to indicate the length indicated by the L-SIG field in the EHT PPDU. A length value indicated by the uplink length field is a positive integer and is a multiple of 3 minus 2.

19 Claims, 19 Drawing Sheets

(58) Field of Classification Search
CPC ... H04L 1/0003; H04L 5/0094; H04L 5/0053; H04L 27/2602; H04L 5/0048; H04L 5/0096
See application file for complete search history.

(56) References Cited

U.S. PATENT DOCUMENTS

| | | | |
|---|---|---|---|
| 2019/0364555 A1 | 11/2019 | Huang et al. | |
| 2020/0136884 A1* | 4/2020 | Park | H04L 27/2665 |
| 2021/0185708 A1* | 6/2021 | Lin | H04W 72/1268 |
| 2021/0288768 A1* | 9/2021 | Yang | H04L 5/0044 |
| 2021/0360525 A1* | 11/2021 | Park | H04W 52/0229 |
| 2022/0021569 A1 | 1/2022 | Park et al. | |
| 2023/0163808 A1* | 5/2023 | Lou | H04W 74/002 455/101 |

FOREIGN PATENT DOCUMENTS

| | | |
|---|---|---|
| CN | 109803392 A | 5/2019 |
| CN | 110708148 A | 1/2020 |
| CN | 110730050 A | 1/2020 |
| EP | 3654723 A1 | 5/2020 |
| EP | 3896929 A1 | 10/2021 |
| GB | 2595517 A | 12/2021 |
| RU | 2700406 C1 | 9/2019 |
| WO | 2020068385 A1 | 4/2020 |
| WO | 2020111638 A1 | 6/2020 |
| WO | 2020122530 A1 | 6/2020 |

OTHER PUBLICATIONS

IEEE P802.11ax/D6.0, "Draft Standard for Information technology—Tele-communications and information exchange between systems Local and metropolitan area networks—Specific requirements, Part 11: Wireless LAN Medium Access Control (MAC) and Physical Layer (PHY) Specifications," Nov. 2019, 780 pages.
IEEE Std 802.11-2016, "IEEE Standard for Information technology—Telecommunications and information exchange between systems Local and metropolitan area networks—Specific requirements, Part 11: Wireless LAN Medium Access Control (MAC) and Physical Layer (PHY) Specifications," Dec. 7, 2016, 3534 pages.
International Search Report and Written Opinion in International Appln. No. PCT/CN2021/113629, dated Nov. 17, 2021, 15 pages (with English translation).
Office Action in Russian Appln. No. 2023106455, dated Apr. 26, 2023, 18 pages (with English machine translation).
Search Report in Russian Appln. No. 2023106455, dated Apr. 26, 2023, 4 pages (with English machine translation).
Extended European Search Report in European Appln No. 21857746.8, dated Jan. 5, 2024, 10 pages.

* cited by examiner

METHOD FOR INDICATING UPLINK PARAMETER OF PPDU AND RELATED APPARATUS

CROSS-REFERENCE TO RELATED APPLICATIONS

This application is a continuation of International Application No. PCT/CN2021/113629, filed on Aug. 19, 2021, which claims priority to Chinese Patent Application No. 202010852462.1, filed on Aug. 21, 2020. The disclosures of the aforementioned applications are hereby incorporated by reference in their entireties.

TECHNICAL FIELD

This application relates to the field of wireless communications technologies, and in particular, to a method for indicating an uplink parameter of a physical layer protocol data unit PPDU and a related apparatus.

BACKGROUND

With the development of the mobile Internet and the popularization of intelligent terminals, data traffic increases rapidly, and users have increasingly high requirements for communication quality of service. The Institute of Electrical and Electronics Engineers (institute of electrical and electronics engineers, IEEE) 802.11ax standard can hardly satisfy user requirements for a large throughput, low jitter, a low latency, and other aspects. Therefore, there is an urgent need to develop a next generation wireless local area network (wireless local area network, WLAN) technology: the IEEE 802.11be standard, the extremely high throughput (extremely high throughput, EHT) standard, or the Wi-Fi 7 standard. Different from IEEE 802.11ax, an ultra-large bandwidth, for example, 320 MHz, is used in IEEE 802.11be, to implement a scenario in which a transmission rate is ultrahigh and ultra-dense users are supported.

Usually, a station (station, STA) needs to perform uplink data transmission after obtaining a transmission opportunity (transmission opportunity, TXOP) through channel contention, for example, obtaining the transmission opportunity by performing channel contention based on enhanced distributed channel access (enhanced distributed channel access, EDCA). A trigger frame-based uplink transmission scheduling method is introduced in IEEE 802.11ax. A trigger frame (trigger frame) sent by an access point (access point, AP) is used to schedule one or more stations to perform uplink data transmission, for example, schedule the station to send a high efficient (high efficient, HE) physical layer protocol data unit (physical layer protocol data unit, PPDU). The trigger frame-based uplink transmission scheduling method in IEEE 802.11ax is also used in the IEEE 802.11be standard. However, in this method, how to indicate an uplink parameter of an EHT PPDU has not been proposed currently.

SUMMARY

Embodiments of this application provide a method for indicating an uplink parameter of a PPDU and a related apparatus, so that a trigger frame in 802.11ax can be reused to schedule a station to send an EHT PPDU with a specified uplink parameter. In this way, receiving the trigger frame by a station supporting the 802.11ax protocol is not affected, and there is no need to design a new trigger frame to schedule a station supporting the 802.11be protocol to send an EHT PPDU. This reduces complexity and reduces signaling overheads.

This application is described below from different aspects. It should be understood that, implementations and beneficial effects thereof in the following different aspects can be referred to each other.

According to a first aspect, this application provides a method for indicating an uplink parameter of a PPDU. The method includes: An AP generates and sends a trigger frame, where the trigger frame includes an uplink length field, and the uplink length field is used to indicate lengths indicated by legacy signal (Legacy Signal, L-SIG) fields in a high efficient trigger based physical layer protocol data unit (High Efficient Trigger Based Physical layer Protocol Data Unit, HE TB PPDU) and an extremely high throughput physical layer protocol data unit EHT PPDU, or the uplink length field is used to indicate the length indicated by the L-SIG field in the EHT PPDU.

Optionally, a length value indicated by the uplink length field is a positive integer and is a multiple of 3 minus 2.

Optionally, after sending the trigger frame, the AP may receive the EHT PPDU from a STA, where the length indicated by the L-SIG field in the EHT PPDU is equal to the length value indicated by the uplink length field plus 2. After receiving the EHT PPDU, the AP may return an acknowledgment frame.

It can be understood that, the L-SIG field includes a length subfield and a rate subfield. The length subfield and the rate subfield in the L-SIG field may indirectly indicate originally determined transmission duration of the PPDU. An implementation of the length indicated by the L-SIG field is a length indicated by the length subfield in the L-SIG field.

In this solution, the uplink length field in the trigger frame is used to indicate the lengths indicated by the L-SIG fields in the EHT PPDU and the HE TB PPDU or indicate the length indicated by the L-SIG field in the EHT PPDU. In this way, both an EHT station and an HE station can be scheduled to perform uplink data transmission, thereby reducing instruction overheads. In addition, the trigger frame in this solution is a trigger frame in 11ax. This can avoid impact on receiving the trigger frame by the HE station and a method for setting the length indicated by the L-SIG field in the HE TB PPDU. Moreover, in this solution, the value indicated by the uplink length field in the trigger frame is set to a multiple of 3 minus 2, and the length indicated by the L-SIG field in the EHT TB PPDU is set to the value indicated by the uplink length field plus 2, to ensure that the length indicated by the L-SIG field in the EHT TB PPDU is a multiple of 3. In this way, the EHT TB PPDU can be automatically detected and can be distinguished from the HE PPDU.

According to a second aspect, this application provides a method for indicating an uplink parameter of a PPDU. The method includes: A STA receives a trigger frame, where the trigger frame includes an uplink length field, and the uplink length field is used to indicate lengths indicated by L-SIG fields in an HE TB PPDU and an EHT PPDU, or the uplink length field is used to indicate the length indicated by the L-SIG field in the EHT PPDU; and the STA generates and sends the EHT PPDU, where the length indicated by the L-SIG field in the EHT PPDU is equal to a length value indicated by the uplink length field plus 2.

Optionally, the length value indicated by the uplink length field is a positive integer and is a multiple of 3 minus 2.

It can be understood that, the L-SIG field includes a length subfield and a rate subfield. The length subfield and the rate subfield in the L-SIG field may indirectly indicate originally determined transmission duration of the PPDU. An implementation of the length indicated by the L-SIG field is a length indicated by the length subfield in the L-SIG field.

According to a third aspect, this application provides a communications apparatus. The communications apparatus may be an AP or a chip in an AP, for example, a Wi-Fi chip. The communications apparatus includes: a processing unit, configured to generate a trigger frame, where the trigger frame includes an uplink length field, and the uplink length field is used to indicate lengths indicated by L-SIG fields in an HE TB PPDU and an EHT PPDU, or the uplink length field is used to indicate the length indicated by the L-SIG field in the EHT PPDU; and a transceiver unit, configured to send the trigger frame.

Optionally, a length value indicated by the uplink length field is a positive integer and is a multiple of 3 minus 2.

Optionally, the transceiver unit is further configured to receive the EHT PPDU from a STA, where the length indicated by the L-SIG field in the EHT PPDU is equal to the length value indicated by the uplink length field plus 2.

It can be understood that, the L-SIG field includes a length subfield and a rate subfield. The length subfield and the rate subfield in the L-SIG field may indirectly indicate originally determined transmission duration of the PPDU. An implementation of the length indicated by the L-SIG field is a length indicated by the length subfield in the L-SIG field.

According to a fourth aspect, this application provides a communications apparatus. The communications apparatus may be a STA or a chip in a STA, for example, a Wi-Fi chip. The communications apparatus includes: a transceiver unit, configured to receive a trigger frame, where the trigger frame includes an uplink length field, and the uplink length field is used to indicate lengths indicated by L-SIG fields in an HE TB PPDU and an EHT PPDU, or the uplink length field is used to indicate the length indicated by the L-SIG field in the EHT PPDU; and a processing unit, configured to generate the EHT PPDU, where the length indicated by the L-SIG field in the EHT PPDU is equal to a length value indicated by the uplink length field plus 2. The transceiver unit is further configured to send the generated EHT PPDU.

Optionally, the length value indicated by the uplink length field is a positive integer and is a multiple of 3 minus 2.

It can be understood that, the L-SIG field includes a length subfield and a rate subfield. The length subfield and the rate subfield in the L-SIG field may indirectly indicate originally determined transmission duration of the PPDU. An implementation of the length indicated by the L-SIG field is a length indicated by the length subfield in the L-SIG field.

In an implementation of any one of the foregoing aspects, a reserved bit in a common information field in the trigger frame and an HE uplink bandwidth field in the common information field jointly indicate an uplink bandwidth used for sending the EHT PPDU; or an EHT common information field in the trigger frame and an HE uplink bandwidth field in a common information field in the trigger frame jointly indicate an uplink bandwidth used for sending the EHT PPDU. The HE uplink bandwidth field in the common information field in the trigger frame is used to indicate an uplink bandwidth used for sending the HE TB PPDU.

In this solution, both the uplink length of the EHT PPDU and the uplink bandwidth for the EHT PPDU are indicated in the trigger frame. This can reduce signaling overheads.

In an implementation of any one of the foregoing aspects, the trigger frame further includes indication information, and the indication information is used to indicate a difference between a quantity of EHT-LTF symbols and a quantity of HE-LTF symbols.

Optionally, a sum of quantities of EHT-LTF symbols and EHT data symbols of the EHT PPDU is equal to a sum of quantities of HE-LTF symbols and HE data symbols of the HE TB PPDU.

Optionally, the indication information is carried in the reserved bit in the common information field in the trigger frame or is carried in the EHT common information field in the trigger frame.

In this solution, the uplink length of the EHT PPDU, the uplink bandwidth for the EHT PPDU, and the quantity of EHT-LTF symbols are all indicated in the trigger frame. This can further reduce the signaling overheads.

In an implementation of any one of the foregoing aspects, the trigger frame is further used to indicate a type of the scheduled uplink EHT PPDU, and the type of the EHT PPDU includes a trigger-based EHT PPDU and an EHT single user PPDU.

Optionally, the type of the EHT PPDU is indicated by a trigger frame type field in the trigger frame or is indicated by a reserved bit in the trigger frame.

Optionally, the trigger frame indicates that the type of the scheduled uplink EHT PPDU is an EHT single user PPDU; and the trigger frame is further used to indicate whether the scheduled uplink EHT PPDU is an EHT single user (single user, SU) low power indoor (low power indoor, LPI) SU LPI PPDU.

Optionally, whether the scheduled uplink EHT PPDU is an EHT SU LPI PPDU is indicated by a modulation and coding scheme field in the trigger frame or is indicated by a reserved bit in an EHT user information field in the trigger frame.

In this solution, uplink transmission of the EHT single user PPDU is further scheduled by using the trigger frame. This can implement scheduling of different types of EHT PPDUs, thereby reducing signaling overheads.

According to a fifth aspect, this application provides another method for indicating an uplink parameter of a PPDU. The method includes: An AP generates and sends a trigger frame, where a reserved bit in a common information field in the trigger frame and an HE uplink bandwidth field in the common information field jointly indicate an uplink bandwidth used for sending an EHT PPDU; or an EHT common information field in the trigger frame and an HE uplink bandwidth field in a common information field in the trigger frame jointly indicate an uplink bandwidth used for sending the EHT PPDU. The HE uplink bandwidth field in the common information field in the trigger frame is used to indicate an uplink bandwidth used for sending an HE TB PPDU.

In this solution, based on reuse of an indication of the HE uplink bandwidth field in the trigger frame in 11ax, fewer bits are used to indicate the uplink bandwidth used for sending the EHT PPDU. Compared with a manner in which 3 bits are directly used to indicate the uplink bandwidth used for sending the EHT PPDU, this manner reduces overheads.

According to a sixth aspect, this application provides another method for indicating an uplink parameter of a PPDU. The method includes: A STA receives a trigger frame, where a reserved bit in a common information field in the trigger frame and an HE uplink bandwidth field in the common information field jointly indicate an uplink bandwidth used for sending an EHT PPDU; or an EHT common information field in the trigger frame and an HE uplink bandwidth field in a common information field in the trigger frame jointly indicate an uplink bandwidth used for sending the EHT PPDU; and the STA generates the EHT PPDU, and sends the EHT PPDU by using the uplink bandwidth indicated by the trigger frame. The HE uplink bandwidth field in the common information field in the trigger frame is used to indicate an uplink bandwidth used for sending an HE TB PPDU.

According to a seventh aspect, this application provides a communications apparatus. The communications apparatus may be an AP or a chip in an AP, for example, a Wi-Fi chip. The communications apparatus includes: a processing unit, configured to generate a trigger frame, where a reserved bit in a common information field in the trigger frame and an HE uplink bandwidth field in the common information field jointly indicate an uplink bandwidth used for sending an EHT PPDU; or an EHT common information field in the trigger frame and an HE uplink bandwidth field in a common information field in the trigger frame jointly indicate an uplink bandwidth used for sending the EHT PPDU; and a transceiver unit, configured to send the trigger frame. The HE uplink bandwidth field in the common information field in the trigger frame is used to indicate an uplink bandwidth used for sending an HE TB PPDU.

According to an eighth aspect, this application provides a communications apparatus. The communications apparatus may be a STA or a chip in a STA, for example, a Wi-Fi chip. The communications apparatus includes: a transceiver unit, configured to receive a trigger frame, where a reserved bit in a common information field in the trigger frame and an HE uplink bandwidth field in the common information field jointly indicate an uplink bandwidth used for sending an EHT PPDU; or an EHT common information field in the trigger frame and an HE uplink bandwidth field in a common information field in the trigger frame jointly indicate an uplink bandwidth used for sending the EHT PPDU; and a processing unit, configured to generate the EHT PPDU. The transceiver unit is further configured to send the EHT PPDU by using the uplink bandwidth indicated by the trigger frame. The HE uplink bandwidth field in the common information field in the trigger frame is used to indicate an uplink bandwidth used for sending an HE TB PPDU.

In an implementation of any one of the foregoing aspects, a 1-bit reserved bit or 2-bit reserved bits in the common information field are used to indicate whether the uplink bandwidth used for sending the EHT PPDU is the same as the uplink bandwidth used for sending the HE TB PPDU. For example, when a value of the 1-bit reserved bit is 0, it indicates that the uplink bandwidth used for sending the EHT PPDU is the same as the uplink bandwidth used for sending the HE TB PPDU; and when the value of the 1-bit reserved bit is 1, it indicates that the uplink bandwidth used for sending the EHT PPDU is 320 MHz. For another example, when values of the 2-bit reserved bits are 00, it indicates that the uplink bandwidth used for sending the EHT PPDU is the same as the uplink bandwidth used for sending the HE TB PPDU; when the values of the 2-bit reserved bits are 01, it indicates that the uplink bandwidth used for sending the EHT PPDU is 320 MHz; and when the values of the 2-bit reserved bits are the other values 10 and 11, the 2-bit reserved bits indicate reserved. For another example, when the values of the 2-bit reserved bits are 00, it indicates that the uplink bandwidth used for sending the EHT PPDU is the same as the uplink bandwidth used for sending the HE TB PPDU; when the values of the 2-bit reserved bits are 01, it indicates that the uplink bandwidth used for sending the EHT PPDU is 160 MHz; when the values of the 2-bit reserved bits are 10, it indicates that the uplink bandwidth used for sending the EHT PPDU is 320 MHz; and when the values of the 2-bit reserved bits are the other values 11, the 2-bit reserved bits indicate reserved.

In an implementation of any one of the foregoing aspects, the EHT common information field may include an EHT uplink bandwidth field, and the EHT uplink bandwidth field is used to indicate whether the uplink bandwidth used for sending the EHT PPDU is the same as the uplink bandwidth used for sending the HE TB PPDU. A length of the EHT uplink bandwidth field may be 1 bit or 2 bits.

According to a ninth aspect, this application provides still another method for indicating an uplink parameter of a PPDU. The method includes: An AP generates and sends a trigger frame, where the trigger frame includes indication information, and the indication information is used to indicate a difference between a quantity of EHT-LTF symbols and a quantity of HE-LTF symbols.

Optionally, after sending the trigger frame, the AP may further receive an EHT PPDU from a STA, where a quantity of EHT-LTF symbols in the EHT PPDU is equal to a sum of a quantity of HE-LTF symbols that is indicated by a number of HE-LTF Symbols and midamble periodicity field in the trigger frame and the quantity value indicated by the indication information This solution provides an indication of the quantity of EHT-LTF symbols, which applicable to a scenario of hybrid transmission of the EHT PPDU and an HE TB PPDU. This can further improve the method for indicating an uplink parameter of a PPDU.

According to a tenth aspect, this application provides still another method for indicating an uplink parameter of a PPDU. The method includes: A STA receives a trigger frame, where the trigger frame includes indication information, and the indication information is used to indicate a difference between a quantity of EHT-LTF symbols and a quantity of HE-LTF symbols; and the STA generates and sends an EHT PPDU, where a quantity of EHT-LTF symbols in the EHT PPDU is equal to a sum of a quantity of HE-LTF symbols that is indicated by a number of HE-LTF Symbols and midamble periodicity field in the trigger frame and the quantity value indicated by the indication information.

According to an eleventh aspect, this application provides a communications apparatus. The communications apparatus may be an AP or a chip in an AP, for example, a Wi-Fi chip. The communications apparatus includes: a processing unit, configured to generate a trigger frame, where the trigger frame includes indication information, and the indication information is used to indicate a difference between a quantity of EHT-LTF symbols and a quantity of HE-LTF symbols; and a transceiver unit, configured to send the trigger frame.

Optionally, the transceiver unit is further configured to receive an EHT PPDU from a STA, where a quantity of EHT-LTF symbols in the EHT PPDU is equal to a sum of a quantity of HE-LTF symbols that is indicated by a number of HE-LTF Symbols and midamble periodicity field in the trigger frame and the quantity value indicated by the indication information.

According to a twelfth aspect, this application provides a communications apparatus. The communications apparatus may be a STA or a chip in a STA, for example, a Wi-Fi chip. The communications apparatus includes: a transceiver unit, configured to receive a trigger frame, where the trigger frame includes indication information, and the indication information is used to indicate a difference between a quantity of EHT-LTF symbols and a quantity of HE-LTF symbols; and a processing unit, configured to generate an EHT PPDU, where a quantity of EHT-LTF symbols in the EHT PPDU is equal to a sum of a quantity of HE-LTF symbols that is indicated by a number of HE-LTF Symbols and midamble periodicity field in the trigger frame and the quantity value indicated by the indication information. The transceiver unit is further configured to send the EHT PPDU.

In an implementation of any one of the foregoing aspects, a sum of quantities of EHT-LTF symbols and EHT data symbols is equal to a sum of quantities of HE-LTF symbols and HE data symbols.

In an implementation of any one of the foregoing aspects, the indication information is carried in a reserved bit in a common information field in the trigger frame or is carried in an EHT common information field in the trigger frame.

According to a thirteenth aspect, this application provides a PPDU transmission method. The method includes: An AP generates and sends a trigger frame, where the trigger frame is used to indicate a type of a scheduled uplink EHT PPDU, and the type of the EHT PPDU includes a trigger-based EHT PPDU and an EHT single user PPDU.

This solution provides a method for scheduling uplink transmission of an EHT SU PPDU or an EHT LPI SU PPDU. In this solution, uplink transmission of an EHT TB PPDU, the EHT SU PPDU, or the EHT LPI SU PPDU is mainly scheduled by using the trigger frame. This can implement scheduling of different types of EHT PPDUs.

According to a fourteenth aspect, this application provides a PPDU transmission method. The method includes: A STA receives a trigger frame, where the trigger frame is used to indicate a type of a scheduled uplink EHT PPDU, and the type of the EHT PPDU includes a trigger-based EHT PPDU and an EHT single user PPDU; and if the trigger frame indicates that the type of the scheduled uplink EHT PPDU is an EHT single user PPDU, the STA generates and sends the EHT single user PPDU.

According to a fifteenth aspect, this application provides a communications apparatus. The communications apparatus may be an AP or a chip in an AP, for example, a Wi-Fi chip. The communications apparatus includes: a processing unit, configured to generate a trigger frame, where the trigger frame is used to indicate a type of a scheduled uplink EHT PPDU, and the type of the EHT PPDU includes a trigger-based EHT PPDU and an EHT single user PPDU; and a transceiver unit, configured to send the trigger frame.

According to a sixteenth aspect, this application provides a communications apparatus. The communications apparatus may be a STA or a chip in a STA, for example, a Wi-Fi chip. The communications apparatus includes: a transceiver unit, configured to receive a trigger frame, where the trigger frame is used to indicate a type of a scheduled uplink EHT PPDU, and the type of the EHT PPDU includes a trigger-based EHT PPDU and an EHT single user PPDU; and a processing unit, configured to: when the trigger frame indicates that the type of the scheduled uplink EHT PPDU is an EHT single user PPDU, generate the EHT single user PPDU. The transceiver unit is further configured to send the EHT single user PPDU.

In an implementation of any one of the foregoing aspects, the type of the EHT PPDU is indicated by a trigger frame type field in the trigger frame or is indicated by a reserved bit in the trigger frame.

In an implementation of any one of the foregoing aspects, the trigger frame is further used to indicate whether the scheduled uplink EHT PPDU is an EHT SU LPI PPDU.

In an implementation of any one of the foregoing aspects, whether the scheduled uplink EHT PPDU is an EHT SU LPI PPDU is indicated by a modulation and coding scheme field in the trigger frame or is indicated by a reserved bit in an EHT user information field in the trigger frame.

According to a seventeenth aspect, this application provides a communications apparatus. The communications apparatus is specifically the AP in the first aspect and includes a processor and a transceiver. The processor is configured to generate a trigger frame, where the trigger frame includes an uplink length field, and the uplink length field is used to indicate lengths indicated by L-SIG fields in an HE TB PPDU and an EHT PPDU, or the uplink length field is used to indicate the length indicated by the L-SIG field in the EHT PPDU; and the transceiver unit is configured to send the trigger frame. Optionally, the AP may further include a memory. The memory is configured to be coupled to the processor, and stores program instructions and data that are necessary for the AP.

According to an eighteenth aspect, this application provides a communications apparatus. The communications apparatus is specifically the STA in the second aspect, and includes a processor and a transceiver. The transceiver is configured to receive a trigger frame, where the trigger frame includes an uplink length field, and the uplink length field is used to indicate lengths indicated by L-SIG fields in an HE TB PPDU and an EHT PPDU, or the uplink length field is used to indicate the length indicated by the L-SIG field in the EHT PPDU; and the processor is configured to generate the EHT PPDU, where the length indicated by the L-SIG field in the EHT PPDU is equal to a length value indicated by the uplink length field plus 2. The transceiver is further configured to send the generated EHT PPDU. Optionally, the STA may further include a memory. The memory is configured to be coupled to the processor, and stores program instructions and data that are necessary for the STA.

According to a nineteenth aspect, this application provides a communications apparatus. The communications apparatus is specifically the AP in the fifth aspect and includes a processor and a transceiver. The processor is configured to generate a trigger frame, where a reserved bit in a common information field in the trigger frame and an HE uplink bandwidth field in the common information field jointly indicate an uplink bandwidth used for sending an EHT PPDU; or an EHT common information field in the trigger frame and an HE uplink bandwidth field in a common information field in the trigger frame jointly indicate an uplink bandwidth used for sending the EHT PPDU; and the transceiver is configured to send the trigger frame. The HE uplink bandwidth field in the common information field in the trigger frame is used to indicate an uplink bandwidth used for sending an HE TB PPDU. Optionally, the AP may further include a memory. The memory is configured to be coupled to the processor, and stores program instructions and data that are necessary for the AP.

According to a twentieth aspect, this application provides a communications apparatus. The communications apparatus is specifically the STA in the sixth aspect and includes a processor and a transceiver. The transceiver unit is configured to receive a trigger frame, where a reserved bit in a common information field in the trigger frame and an HE uplink bandwidth field in the common information field jointly indicate an uplink bandwidth used for sending an EHT PPDU; or an EHT common information field in the trigger frame and an HE uplink bandwidth field in a common information field in the trigger frame jointly indicate an uplink bandwidth used for sending the EHT PPDU; and the processor is configured to generate the EHT PPDU. The transceiver is further configured to send the EHT PPDU by using the uplink bandwidth indicated by the trigger frame. The HE uplink bandwidth field in the common information field in the trigger frame is used to indicate an uplink bandwidth used for sending an HE TB PPDU. Optionally, the STA may further include a memory. The memory is configured to be coupled to the processor, and stores program instructions and data that are necessary for the STA.

According to a twenty-first aspect, this application provides a communications apparatus. The communications apparatus is specifically the AP in the ninth aspect and includes a processor and a transceiver. The processor is configured to generate a trigger frame, where the trigger frame includes indication information, and the indication information is used to indicate a difference between a quantity of EHT-LTF symbols and a quantity of HE-LTF symbols; and the transceiver is configured to send the trigger frame. Optionally, the AP may further include a memory. The memory is configured to be coupled to the processor, and stores program instructions and data that are necessary for the AP.

According to a twenty-second aspect, this application provides a communications apparatus. The communications apparatus is specifically the STA in the tenth aspect and includes a processor and a transceiver. The transceiver is configured to receive a trigger frame, where the trigger frame includes indication information, and the indication information is used to indicate a difference between a quantity of EHT-LTF symbols and a quantity of HE-LTF symbols; and the processor is configured to generate an EHT PPDU, where a quantity of EHT-LTF symbols in the EHT PPDU is equal to a sum of a quantity of HE-LTF symbols that is indicated by a number of HE-LTF Symbols and midamble periodicity field in the trigger frame and the quantity value indicated by the indication information. The transceiver is further configured to send the EHT PPDU. Optionally, the STA may further include a memory. The memory is configured to be coupled to the processor, and stores program instructions and data that are necessary for the STA.

According to a twenty-third aspect, this application provides a communications apparatus. The communications apparatus is specifically the AP in the thirteenth aspect and includes a processor and a transceiver. The processor is configured to generate a trigger frame, where the trigger frame is used to indicate a type of a scheduled uplink EHT PPDU, and the type of the EHT PPDU includes a trigger-based EHT PPDU and an EHT single user PPDU; and the transceiver is configured to send the trigger frame. Optionally, the AP may further include a memory. The memory is configured to be coupled to the processor, and stores program instructions and data that are necessary for the AP.

According to a twenty-fourth aspect, this application provides a communications apparatus. The communications apparatus is specifically the STA in the fourteenth aspect and includes a processor and a transceiver. The transceiver is configured to receive a trigger frame, where the trigger frame is used to indicate a type of a scheduled uplink EHT PPDU, and the type of the EHT PPDU includes a trigger-based EHT PPDU and an EHT single user PPDU; and the processor is configured to: when the trigger frame indicates that the type of the scheduled uplink EHT PPDU is an EHT single user PPDU, generate the EHT single user PPDU. The transceiver is further configured to send the EHT single user PPDU. Optionally, the STA may further include a memory. The memory is configured to be coupled to the processor, and stores program instructions and data that are necessary for the STA.

According to a twenty-fifth aspect, this application provides a chip or a chip system, including an input/output interface and a processing circuit. The processing circuit is configured to generate a trigger frame, where the trigger frame includes an uplink length field, and the uplink length field is used to indicate lengths indicated by L-SIG fields in an HE TB PPDU and an EHT PPDU, or the uplink length field is used to indicate the length indicated by the L-SIG field in the EHT PPDU; and the input/output interface is configured to send the trigger frame.

In a possible design, the input/output interface is configured to receive the trigger frame, where the trigger frame includes the uplink length field, and the uplink length field is used to indicate the lengths indicated by the L-SIG fields in the HE TB PPDU and the EHT PPDU, or the uplink length field is used to indicate the length indicated by the L-SIG field in the EHT PPDU; and the processing circuit is configured to generate the EHT PPDU, where the length indicated by the L-SIG field in the EHT PPDU is equal to a length value indicated by the uplink length field plus 2. The input/output interface is further configured to send the generated EHT PPDU.

According to a twenty-sixth aspect, this application provides a chip or a chip system, including an input/output interface and a processing circuit. The processing circuit is configured to generate a trigger frame, where a reserved bit in a common information field in the trigger frame and an HE uplink bandwidth field in the common information field jointly indicate an uplink bandwidth used for sending an EHT PPDU; or an EHT common information field in the trigger frame and an HE uplink bandwidth field in a common information field in the trigger frame jointly indicate an uplink bandwidth used for sending the EHT PPDU; and the input/output interface is configured to send the trigger frame. The HE uplink bandwidth field in the common information field in the trigger frame is used to indicate an uplink bandwidth used for sending an HE TB PPDU.

In a possible design, the input/output interface is configured to receive a trigger frame, where a reserved bit in a common information field in the trigger frame and an HE uplink bandwidth field in the common information field jointly indicate an uplink bandwidth used for sending an EHT PPDU; or an EHT common information field in the trigger frame and an HE uplink bandwidth field in a common information field in the trigger frame jointly indicate an uplink bandwidth used for sending the EHT PPDU; and the processing circuit is configured to generate the EHT PPDU. The input/output interface is further configured to send the EHT PPDU by using the uplink bandwidth indicated by the trigger frame. The HE uplink bandwidth field in the common information field in the trigger frame is used to indicate an uplink bandwidth used for sending an HE TB PPDU.

According to a twenty-seventh aspect, this application provides a chip or a chip system, including an input/output interface and a processing circuit. The processing circuit is configured to generate a trigger frame, where the trigger frame includes indication information, and the indication information is used to indicate a difference between a quantity of EHT-LTF symbols and a quantity of HE-LTF symbols; and the input/output interface is configured to send the trigger frame.

In a possible design, the input/output interface is configured to receive a trigger frame, where the trigger frame includes indication information, and the indication information is used to indicate a difference between a quantity of EHT-LTF symbols and a quantity of HE-LTF symbols; and the processing circuit is configured to generate an EHT PPDU, where a quantity of EHT-LTF symbols in the EHT PPDU is equal to a sum of a quantity of HE-LTF symbols that is indicated by a number of HE-LTF Symbols and midamble periodicity field in the trigger frame and the quantity value indicated by the indication information. The input/output interface is further configured to send the EHT PPDU.

According to a twenty-eighth aspect, this application provides a chip or a chip system, including an input/output interface and a processing circuit. The processing circuit is configured to generate a trigger frame, where the trigger frame is used to indicate a type of a scheduled uplink EHT PPDU, and the type of the EHT PPDU includes a trigger-based EHT PPDU and an EHT single user PPDU; and the input/output interface is configured to send the trigger frame.

In a possible design, the input/output interface is configured to receive a trigger frame, where the trigger frame is used to indicate the type of the scheduled uplink EHT PPDU, and the type of the EHT PPDU includes the trigger-based EHT PPDU and the EHT single user PPDU; and the processing circuit is configured to: when the trigger frame indicates that the type of the scheduled uplink EHT PPDU is an EHT single user PPDU, generate the EHT single user PPDU. The input/output interface is further configured to send the EHT single user PPDU.

According to a twenty-ninth aspect, this application provides a computer-readable storage medium. The computer-readable storage medium stores instructions. When the instructions are run on a computer, the computer is enabled to perform the method for indicating an uplink parameter of a PPDU according to the first aspect, the second aspect, the fifth aspect, the sixth aspect, the ninth aspect, or the tenth aspect.

According to a thirtieth aspect, this application provides a computer-readable storage medium. The computer-readable storage medium stores instructions. When the instructions are run on a computer, the computer is enabled to perform the PPDU transmission method according to the thirteenth aspect or the fourteenth aspect.

According to a thirty-first aspect, this application provides a computer program product including instructions. When the computer program product runs on a computer, the computer is enabled to perform the method for indicating an uplink parameter of a PPDU according to the first aspect, the second aspect, the fifth aspect, the sixth aspect, the ninth aspect, or the tenth aspect.

According to a thirty-second aspect, this application provides a computer program product including instructions. When the computer program product runs on a computer, the computer is enabled to perform the PPDU transmission method according to the thirteenth aspect or the fourteenth aspect.

By implementing the embodiments of this application, a trigger frame in 802.11ax can be used to schedule a station to send an EHT PPDU with a specified uplink parameter. In this way, receiving the trigger frame by a station supporting the 802.11ax protocol is not affected, and there is no need to design a new trigger frame to schedule a station supporting the 802.11be protocol to send an EHT PPDU. This reduces complexity and reduces signaling overheads.

BRIEF DESCRIPTION OF DRAWINGS

To describe the technical solutions in the embodiments of this application more clearly, the following briefly describes the accompanying drawings used in describing the embodiments.

DESCRIPTION OF EMBODIMENTS

The following clearly describes the technical solutions in embodiments of this application with reference to the accompanying drawings in the embodiments of this application.

To facilitate understanding of a method provided in the embodiments of this application, the following describes a system architecture and/or an application scenario in the method provided in the embodiments of this application. A system architecture and/or a scenario described in the embodiments of this application are intended to describe the technical solutions in the embodiments of this application more clearly, and do not constitute a limitation to the technical solutions provided in the embodiments of this application.

Embodiments of this application provide a method for indicating an uplink parameter of a PPDU, so that a trigger frame in 802.11ax can be used to schedule a station to send an EHT PPDU with a specified uplink parameter. In this way, receiving the trigger frame by a station supporting the 802.11ax protocol is not affected, and there is no need to design a new trigger frame to schedule a station supporting the 802.11be protocol to send an EHT PPDU. This reduces complexity and reduces signaling overheads. The method for indicating an uplink parameter of a PPDU may be applied to a wireless communications system, for example, a wireless local area network system. The method for indicating an uplink parameter of a PPDU may be implemented by a communications device in the wireless communications system or a chip or a processor in a communications device. The communications device may be an access point device or a station device. The communications device may alternatively be a wireless communications device that supports parallel transmission on a plurality of links. For example, the communications device may be referred to as a multi-link device (multi-link device, MLD) or a multi-band device. Compared with a communications device that supports only single-link transmission, a multi-link device has higher transmission efficiency and a larger throughput.

Figure 1:
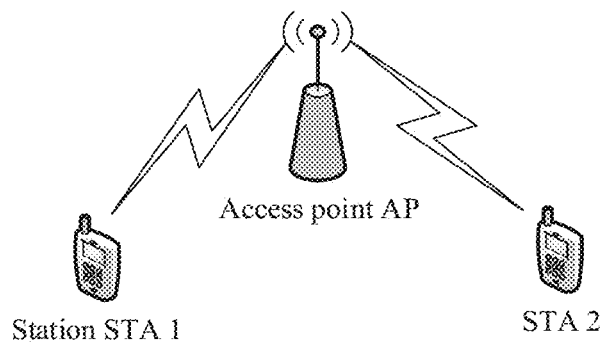
FIG. 1 is a schematic diagram of an architecture of a wireless communications system according to an embodiment of this application.

FIG. 1 is a schematic diagram of an architecture of a wireless communications system according to an embodiment of this application. As shown in FIG. 1, the wireless communications system may include one or more APs (for example, an AP shown in FIG. 1) and one or more STAs (for example, a STA 1 and a STA 2 shown in FIG. 1). The AP and the STA support a WLAN communications protocol. The communications protocol may include IEEE 802.11be (or referred to as Wi-Fi 7 or the EHT protocol), and may further include protocols such as IEEE 802.11ax and IEEE 802.11ac. Certainly, with continuous evolution and development of communications technologies, the communications protocol may further include a next-generation protocol of IEEE 802.11be. WLAN is used as an example. An apparatus for implementing a method in this application may be an AP or a STA in the WLAN, or a chip or a processing system installed in an AP or a STA.

An access point (AP) is an apparatus with a wireless communications function, supports communication performed by using the WLAN protocol, and has a function of communicating with another device (for example, a station or another access point) in a WLAN network. Certainly, the access point may further have a function of communicating with another device. In a WLAN system, an access point may be referred to as an access point station (AP STA). The apparatus with a wireless communications function may be an entire device, or may be a chip, a processing system, or the like installed in an entire device. The device in which the chip or the processing system is installed may implement the method and a function in the embodiments of this application under control of the chip or the processing system. The AP in this embodiment of this application is an apparatus that provides a service for a STA, and can support the 802.11 series protocol. For example, the AP may be a communications entity such as a communications server, a router, a switch, or a network bridge. The AP may include macro base stations, micro base stations, relay stations, and the like in various forms. Certainly, the AP may alternatively be a chip and a processing system in the devices in various forms, to implement the method and the function in this embodiment of this application.

The station (for example, the STA 1 or the STA 2 in FIG. 1) is an apparatus with a wireless communications function, supports communication performed by using the WLAN protocol, and has a capability of communicating with another station or an access point in the WLAN network. In the WLAN system, the station may be referred to as a non-access point station (non-access point station, non-AP STA). For example, the STA is any user communications device that allows a user to communicate with an AP and then communicate with a WLAN. The apparatus with a wireless communications function may be an entire device, or may be a chip, a processing system, or the like installed in an entire device. The device in which the chip or the processing system is installed may implement the method and the function in the embodiments of this application under control of the chip or the processing system. For example, the STA may be user equipment that can be connected to the Internet, for example, a tablet computer, a desktop computer, a laptop computer, a notebook computer, an ultra-mobile personal computer (Ultra-mobile Personal Computer, UMPC), a handheld computer, a netbook, a personal digital assistant (Personal Digital Assistant, PDA), or a mobile phone; an Internet of Things node in the Internet of Things; or an in-vehicle communications apparatus, an entertainment device, a game device or system, a global positioning system device, or the like in the Internet of Vehicles. The STA may alternatively be a chip and a processing system in the foregoing terminals.

The WLAN system can provide high-rate and low-latency transmission. With the continuous evolution of WLAN application scenarios, the WLAN system is applied to more scenarios or industries, for example, the Internet of Things industry, the Internet of Vehicles industry, the banking industry, working in an enterprise, a stadium, an exhibition hall, a concert hall, a hotel room, a dormitory, a ward, a classroom, a supermarket, a square, a street, a production workshop, and a warehouse. Certainly, a device supporting WLAN communication (for example, an access point or a station) may be a sensor node (for example, a smart water meter, a smart electric meter, or a smart air detection node) in a smart city, a smart device (for example, a smart camera, a projector, a display screen, a television, a stereo, a refrigerator, or a washing machine) in smart home, a node and an entertainment terminal (for example, a wearable device such as an AR device or a VR device) in Internet of Things, a smart device (for example, a printer, a projector, a loudspeaker, or a stereo) in a smart office, an Internet of Vehicles device in the Internet of Vehicles, infrastructure (for example, a vending machine, a self-service navigation desk of a supermarket, a self-service cashier desk, or a self-service meal-ordering machine) in a daily life scenario, a device in a large-scale stadium and a music hall, or the like.

Specific forms of the STA and the AP are not limited in this embodiment of this application, and are merely described herein by using examples.

Optionally, FIG. 1 is merely a schematic diagram. In addition to a scenario in which an AP communicates with one or more STAs, the method for indicating an uplink parameter of a PPDU provided in the embodiments of this application may be applied to a scenario in which an AP communicates with another AP, and is also applicable to a scenario in which a STA communicates with another STA.

Figure 2A:
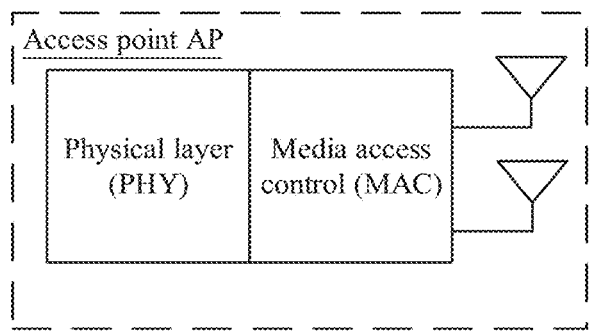
FIG. 2a is a schematic diagram of a structure of an access point according to an embodiment of this application.
Figure 2B:
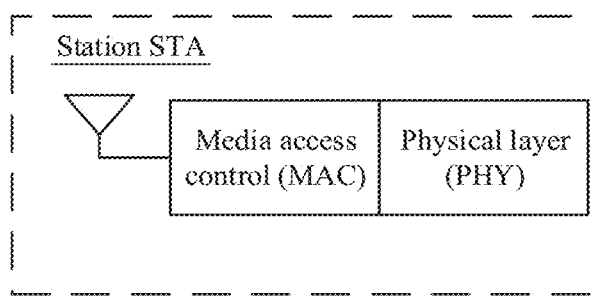
FIG. 2b is a schematic diagram of a structure of a station according to an embodiment of this application.

Optionally, FIG. 2a is a schematic diagram of a structure of an access point according to an embodiment of this application. The AP may be a multi-antenna AP or may be a single-antenna AP. In FIG. 2a, the AP includes a physical layer (physical layer, PHY) processing circuit and a medium access control (medium access control, MAC) processing circuit. The physical layer processing circuit may be configured to process a physical layer signal, and the MAC layer processing circuit may be configured to process a MAC layer signal. The 802.11 standard focuses on PHY and MAC parts. FIG. 2b is a schematic diagram of a structure of a station according to an embodiment of this application. FIG. 2b is a schematic diagram of a structure of a single-antenna STA. In an actual scenario, the STA may alternatively be a multi-antenna STA and may be a device with more than two antennas. In FIG. 2b, the STA may include a PHY processing circuit and a MAC processing circuit. The physical layer processing circuit may be configured to process a physical layer signal, and the MAC layer processing circuit may be configured to process a MAC layer signal.

The system architecture in the embodiments of this application is briefly described in the foregoing content. To better understand technical solutions in the embodiments of this application, the following describes content related to the embodiments of this application, and specifically relates to a trigger frame-based uplink transmission scheduling method in the IEEE 802.11be standard.

Figure 3A:
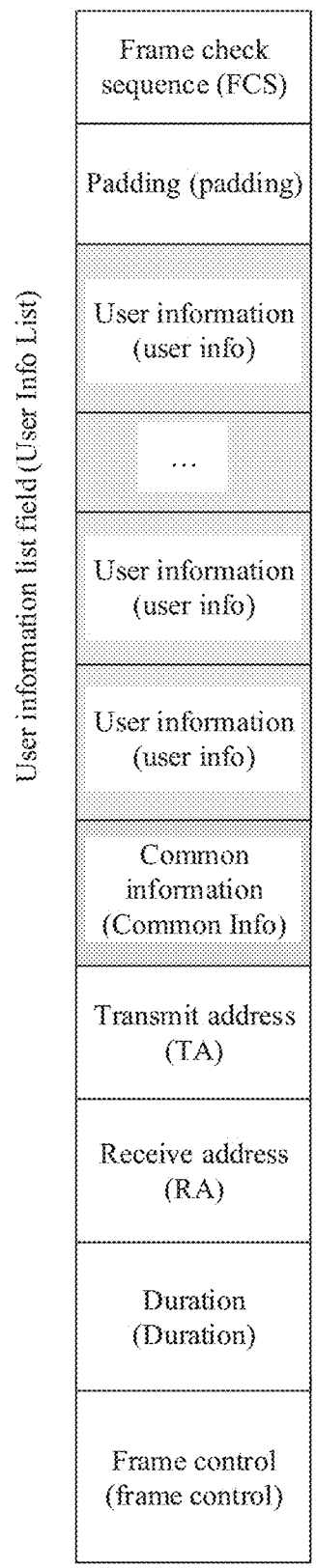
FIG. 3a is a schematic diagram of a frame format of a trigger frame according to an embodiment of this application.
Figure 3B:
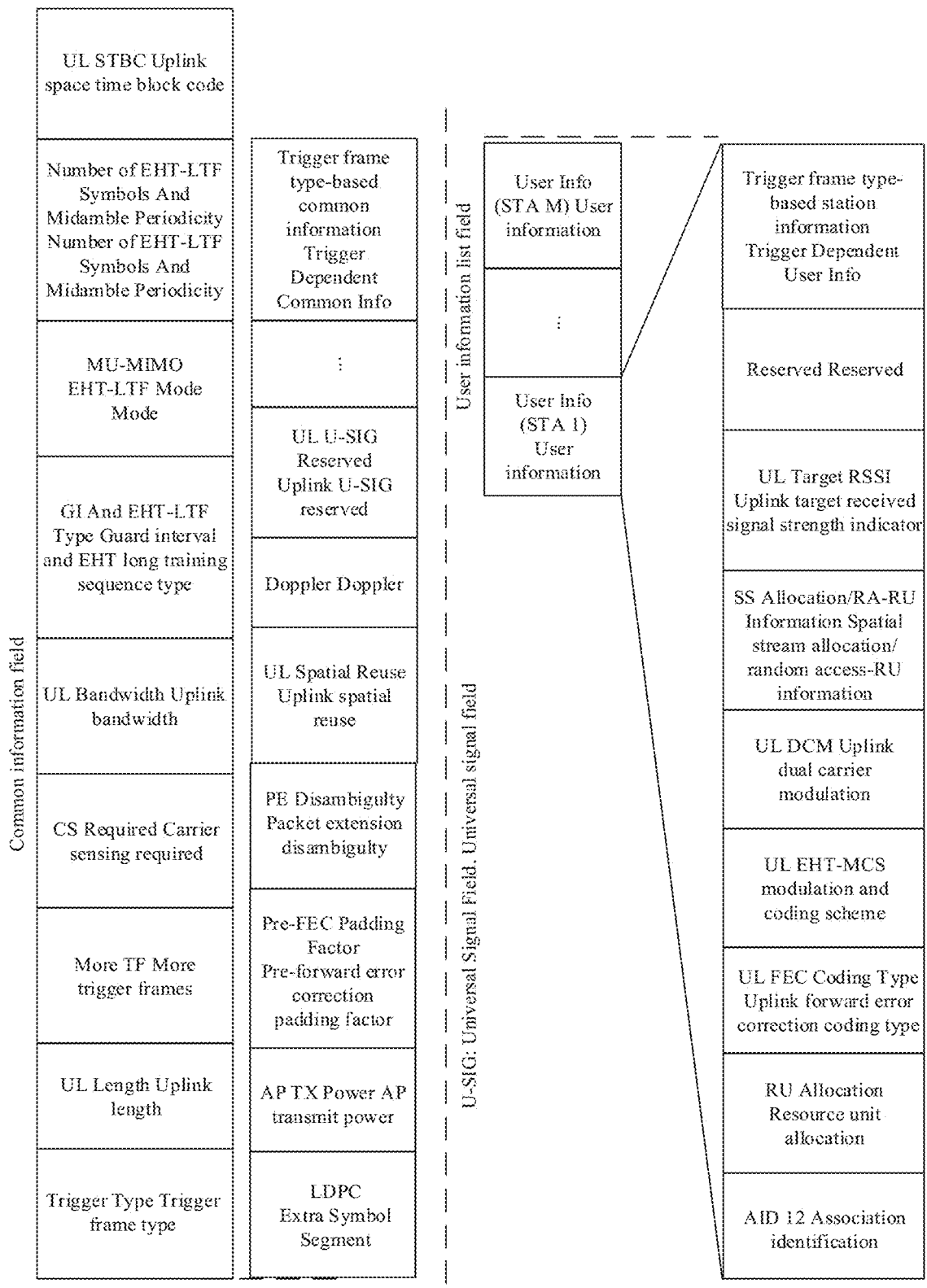
FIG. 3b is a schematic diagram of a frame format of a common information field and a user information field in a trigger frame according to an embodiment of this application.

In an implementation, the trigger frame-based uplink transmission scheduling method in the IEEE 802.11be standard specifically includes the following:

(1) An AP sends a trigger frame. The trigger frame is used to schedule one or more STAs to send an uplink trigger-based EHT PPDU (commonly, the PPDU may also be referred to as a data packet or a data packet). The trigger-based EHT PPDU may be abbreviated as EHT TB PPDU (Extremely High Throughput Trigger Based Physical layer Protocol Data Unit). FIG. 3a is a schematic diagram of a frame format of a trigger frame according to an embodiment of this application. As shown in FIG. 3a, the trigger frame includes a common information (common information) field and a user information list (user information list) field. The common information field includes common information that all STAs need to read, the user information list field includes one or more user information fields, and one user information field includes information that one STA needs to read. FIG. 3b is a schematic diagram of a frame format of a common information field and a user information field in a trigger frame according to an embodiment of this application. As shown in FIG. 3b, in the user information field, an association identification 12 (association identification 12, AID 12) indicates an association identification of a STA, and a resource unit (resource unit, RU) allocation (RU allocation) subfield is used to indicate a specific resource unit location allocated to the STA (the STA indicated by the AID 12).

Figure 4:
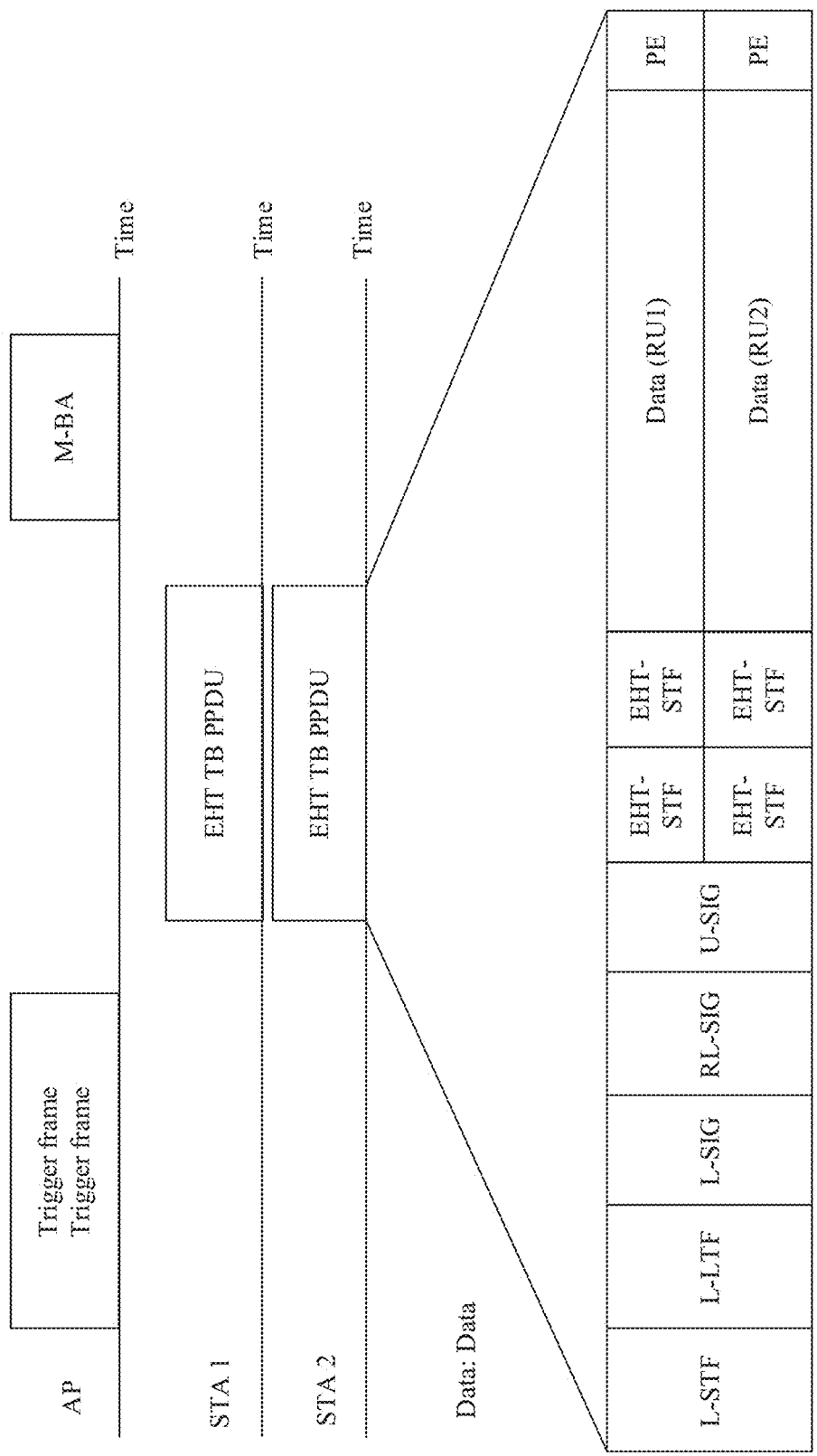
FIG. 4 is a schematic diagram of a time sequence of a trigger frame-based uplink transmission scheduling method.

(2) After receiving the trigger frame, the STA obtains, from the trigger frame through parsing, a user information field that matches an AID of the STA, and then sends the EHT PDDU on an RU indicated by a resource unit allocation subfield in the user information field. (3) After receiving the EHT PDDU, the AP returns an acknowledgment frame to the STA to confirm that the AP has received the EHT PPDU. FIG. 4 is a schematic diagram of a time sequence of a trigger frame-based uplink transmission scheduling method. As shown in FIG. 4, an AP sends a trigger frame. After receiving the trigger frame, a STA 1 and a STA 2 separately send an EHT PPDU after a time period. After receiving the EHT PPDUs, the AP returns multiple station block acknowledgment (Multiple STA Block Acknowledge, M-BA) frames after a time period.

Optionally, for meanings of fields that may be included in the EHT PPDU, refer to Table 1.

TABLE 1

| English abbreviation | Full English description | Function |
| --- | --- | --- |
| L-STF | Legacy Short Training Field | It is used for PPDU discovery, coarse synchronization, and automatic gain control. |
| L-LTF | Legacy Long Training Field | It is used for precise synchronization and channel estimation. |
| L-SIG | Legacy Signal Field | It is used to carry signaling information related to a PPDU length to ensure coexistence. |
| RL-SIG | Repeated Legacy Signal Field | It is the same as the L-SIG, and is used for automatic detection together with the L-SIG to improve reliability. |
| U-SIG | Universal SIG | It is similar to HE-SIG-A, and a difference lies in that it starts from an EHT PPDU. A unified signal field is used in a subsequent standard uses a universal signal field. Therefore, it is referred to as a universal signal field. |
| EHT-STF | Extremely High Throughput Short Training Field | It is used for automatic gain control for subsequent fields |
| EHT-LTF | Extremely High Throughput Long Training Field | It is used for channel estimation. |
| Data | | It carries data information. |
| PE | Packet Extension | It is used to prolong a processing time of a receiver. |

It can be understood that, for a station supporting the 802.11be protocol, the station may receive a trigger frame in 11ax, or may receive a trigger frame in 11be. In this implementation, the trigger frame in 11ax and the trigger frame in 11be use different trigger frame types to notify a STA supporting 11be whether the STA should respond to the trigger frame according to a format of an HE TB PPDU or a format of an EHT TB PPDU.

However, in this implementation, a new trigger frame type is introduced, and trigger frames corresponding to 11be need to be designed for all trigger frames of different subtypes in 11ax. As a result, design is complex. In addition, this implementation does not support a scenario in which both a station supporting 11ax and a station supporting 11be are scheduled simultaneously to perform hybrid transmission of an HE TB PPDU and an EHT PPDU.

Figure 5:
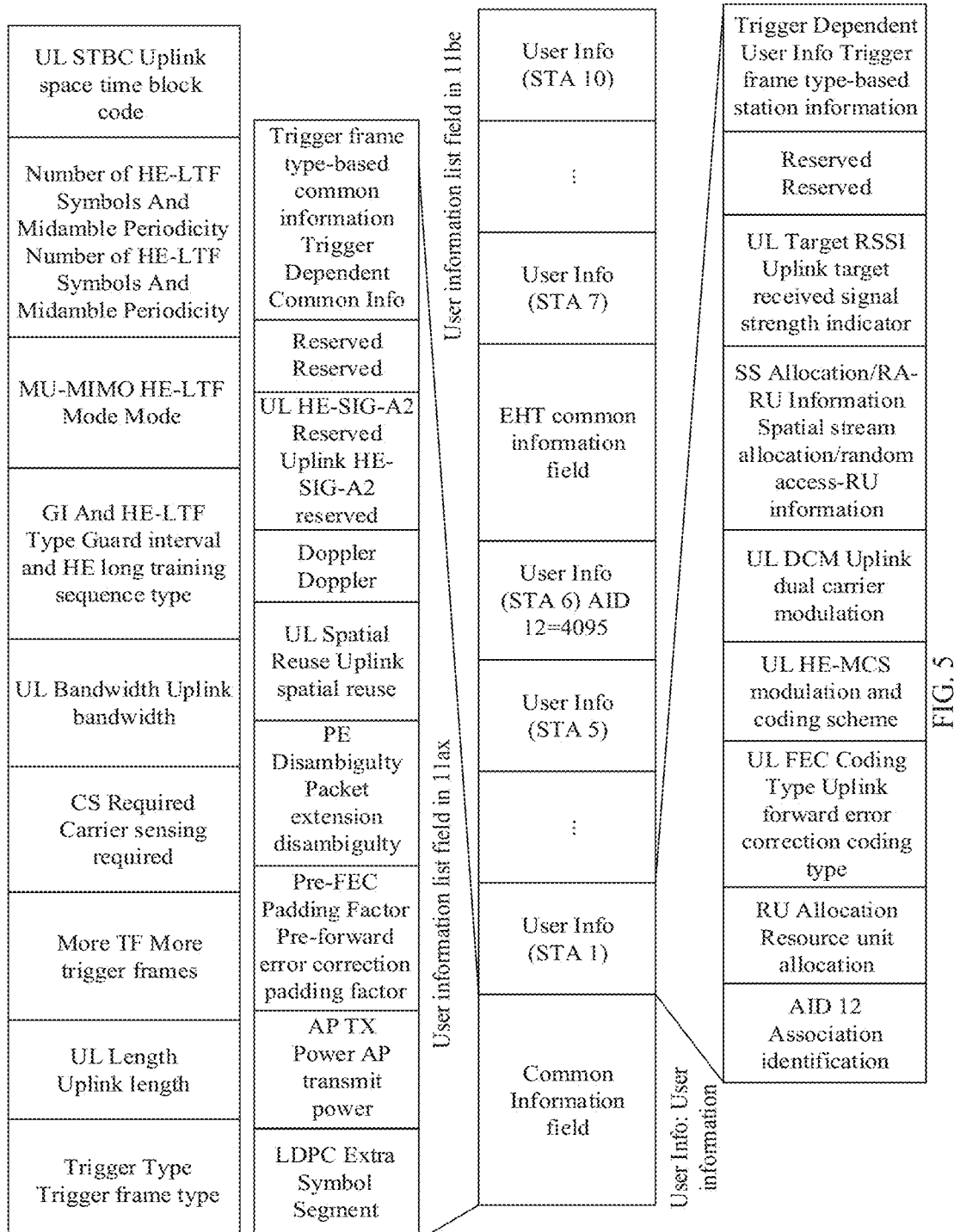
FIG. 5 is a schematic diagram of another frame format of a common information field and a user information field in a trigger frame according to an embodiment of this application.

In another implementation, the trigger frame in 11ax is used to simultaneously schedule a STA supporting 11ax to send an HE PPDU and schedule a STA supporting 11be to send an EHT PPDU, to achieve an effect of hybrid transmission scheduling. Specifically, FIG. 5 is a schematic diagram of another frame format of a common information field and a user information field in a trigger frame according to an embodiment of this application. As shown in FIG. 5, the common information field in the trigger frame is the same as a common information field in a trigger frame in 11ax, and include common information that all STAs supporting 11ax need to read. The first five user information fields following the common information field are user information list fields in 11ax. User information fields corresponding to a STA 1 to a STA 5 in FIG. 5 form the user information list fields in 11ax. In a user information field corresponding to a STA 6, an association identification AID 12 is 4095, and AID 12=4095 indicates cutoff of useful information and start of a padding bit in the 11ax standard. Therefore, a conventional STA supporting 11ax does not continue to parse subsequent information. Therefore, by using this feature, in the 11be standard, common information (for example, an EHT common information field) in 11be and user information in 11be (for example, a user information list field in 11be) may be further indicated. Optionally, a STA supporting 11be and a STA supporting 11ax may use a same common information field, that is, may both use a common information field at the forefront. In other words, an EHT common information field shown in FIG. 5 does not exist.

It can be understood that, the trigger frame of 11ax is used in this implementation to simultaneously schedule the STA supporting 11ax to send the HE PPDU and schedule the STA supporting 11be to send the EHT PPDU. This achieves the effect of hybrid transmission scheduling, thereby reducing design complexity. However, in this implementation, how to indicate an uplink parameter, for example, an uplink length and an uplink bandwidth, of the EHT PPDU is not indicated. Therefore, in a trigger frame-based uplink transmission scheduling process in 11be, how to indicate an uplink parameter of a PPDU becomes a problem that urgently needs to be resolved.

Embodiments of this application provide a method for indicating an uplink parameter of a PPDU, so that a trigger frame in 802.11ax can be used to schedule a station to send an EHT PPDU with a specified uplink parameter. In this way, receiving the trigger frame by a station supporting the 802.11ax protocol is not affected, and there is no need to design a new trigger frame to schedule a station supporting the 802.11be protocol to send an EHT PPDU. This reduces complexity and reduces signaling overheads.

The following describes in detail technical solutions provided in this application with reference to more accompanying drawings.

Technical solutions provided in this application are described by using Embodiment 1 to Embodiment 4. In Embodiment 1, an indication of an uplink length of an EHT PPDU and an indication of length (length) subfields in legacy signal (Legacy Signal, L-SIG) fields in an HE TB PPDU and the EHT PPDU are described. In Embodiment 2, an indication of an uplink bandwidth of the EHT PPDU is described. In Embodiment 3, an indication of a quantity of EHT-LTF symbols is described. In Embodiment 4, a transmission method in which a STA is triggered to send a single user (single user, SU) low power indoor (low power indoor, LPI) PPDU is described. The following separately describes Embodiment 1 to Embodiment 4 in detail. It can be understood that, the technical solutions described in Embodiment 1 to Embodiment 4 of this application may be combined in any manner to form a new embodiment.

It can be understood that, an AP and a STA in this application each may be a single-link device, or may be a functional entity or a functional unit in a multi-link device. For example, in this application, the AP is an AP in an AP multi-link device, and the STA is a STA in a station multi-link device. This is not limited in this application.

Embodiment 1

In Embodiment 1 of this application, an indication of an uplink length of an EHT PPDU and an indication of length subfields in L-SIG fields in an HE TB PPDU and the EHT PPDU are mainly described.

Figure 6:
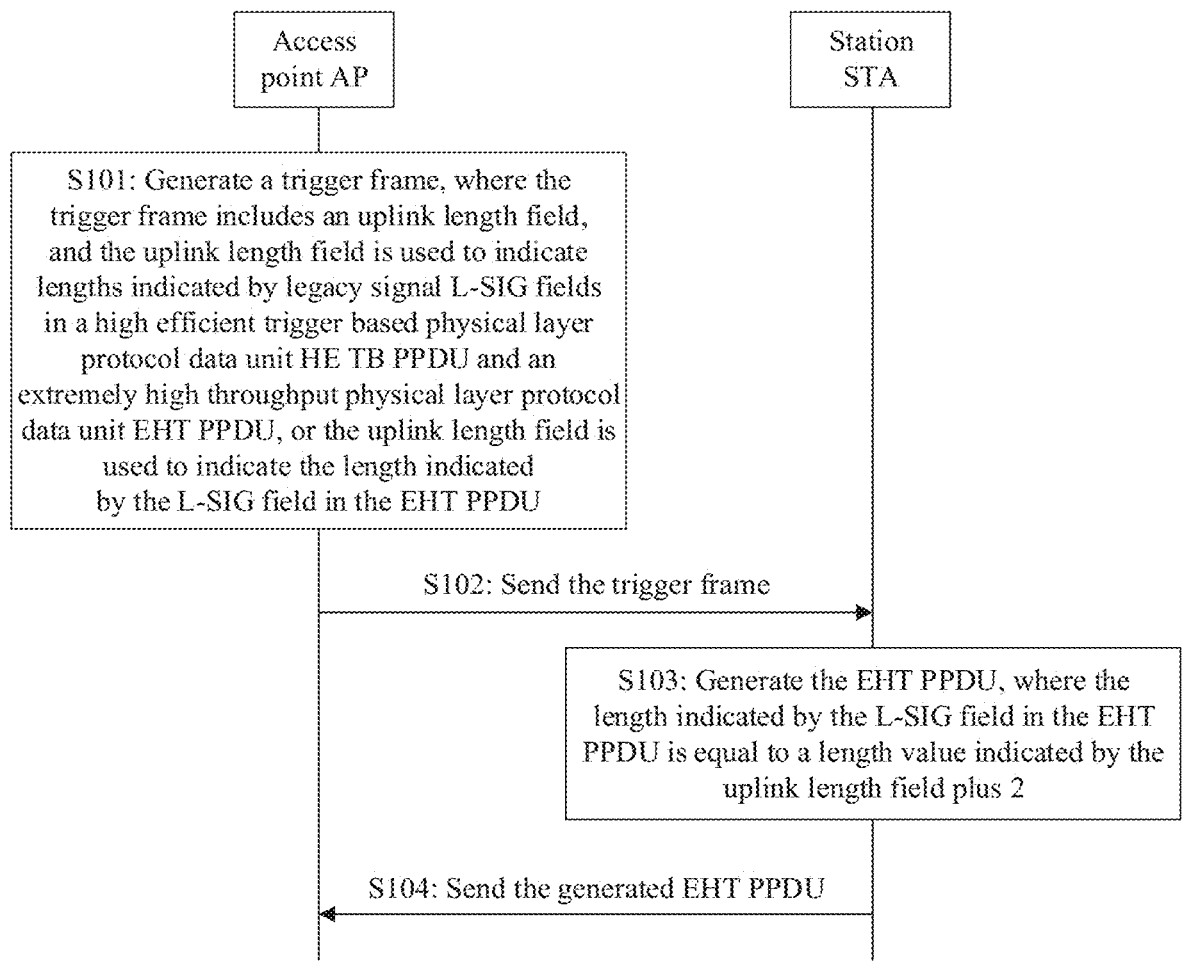
FIG. 6 is a schematic flowchart of a method for indicating an uplink parameter of a PPDU according to an embodiment of this application.

FIG. 6 is a schematic flowchart of a method for indicating an uplink parameter of a PPDU according to an embodiment of this application. The method for indicating an uplink parameter of a PPDU is described by using an example in which the method is implemented in a communications system including one AP and one or more STAs. The AP supports the IEEE 802.11be protocol (also referred to as Wi-Fi 7 or the EHT protocol), and may further support another WLAN communications protocol, for example, the IEEE 802.11ax protocol and the IEEE 802.11ac protocol. At least one of the one or more STAs supports the IEEE 802.11be protocol. It should be understood that, the AP and the STA in this embodiment of this application may further support a next-generation protocol of IEEE 802.11be. In other words, the method for indicating an uplink parameter of a PPDU provided in this embodiment of this application not only is applicable to the IEEE 802.11be protocol, but also is applicable to the next-generation protocol of IEEE 802.11be.

As shown in FIG. 6, the method for indicating an uplink parameter of a PPDU includes but is not limited to the following steps.

S101: The AP generates a trigger frame, where the trigger frame includes an uplink length field, and the uplink length field is used to indicate lengths indicated by legacy signal L-SIG fields in a high efficiency trigger based physical layer protocol data unit HE TB PPDU and an extremely high throughput physical layer protocol data unit EHT PPDU, or the uplink length field is used to indicate the length indicated by the L-SIG field in the EHT PPDU.

S102: The AP sends the trigger frame. Correspondingly, the STA receives the trigger frame.

For a frame format of the trigger frame, refer to FIG. 3a, and the trigger frame includes a common information field and a user information list field. For a frame format of the common information field, refer to a common information field part shown in FIG. 3b or FIG. 5, and the common information field includes an uplink length field. The uplink length field may be used to indicate lengths indicated by L-SIG fields in both the HE TB PPDU and the EHT PPDU. Alternatively, the uplink length field may be used to indicate only the length indicated by the L-SIG field in the EHT PPDU. In other words, the trigger frame may be used to simultaneously schedule a station supporting 11ax to send the HE TB PPDU and schedule a station supporting 11be to send the EHT PPDU. Alternatively, the trigger frame is used to only schedule the station supporting 11be to send the EHT PPDU. In other words, the trigger frame may be applied to a scenario in which hybrid transmission scheduling of the HE TB PPDU and the EHT PPDU is performed, or may be applied to a scenario in which only transmission of the EHT PPDU is scheduled.

The EHT PPDU in this embodiment of this application may be a trigger-based EHT PPDU (which may be abbreviated as EHT TB PPDU), an EHT single user PPDU (which may be abbreviated as EHT SU PPDU), or a single user low power indoor EHT PPDU (which may be EHT SU LPI PPDU). It can be understood that, the EHT SU PPDU may also be referred to as an EHT MU PPDU (multiple user EHT PPDU, multiple user EHT PPDU) sent to a single user. EHT PPDUs sent to a single user and multiple users may be collectively referred to as EHT MU PPDUs. A name of the PPDU is not limited in this embodiment of this application.

Optionally, a length value indicated by the uplink length field in the trigger frame is a positive integer and is a multiple of 3 minus 2.

Specifically, after generating the trigger frame, the AP may send the trigger frame in a broadcast mode. Correspondingly, one or more stations receive the trigger frame.

S103: The STA generates the EHT PPDU. The length indicated by the L-SIG field in the EHT PPDU is equal to the length value indicated by the uplink length field plus 2.

S104: The STA sends the generated EHT PPDU.

Specifically, the length value indicated by the uplink length field in the trigger frame is a positive integer, and is a multiple of 3 minus 2. After receiving the trigger frame, the STA may set, based on the length value indicated by the uplink length field in the trigger frame, the length indicated by the L-SIG field in the EHT PPDU to the length value indicated by the uplink length field plus 2. Therefore, the length indicated by the L-SIG field in the EHT PPDU generated by the STA is equal to the length value indicated by the uplink length field plus 2. In other words, the length indicated by the L-SIG field in the EHT PPDU is a multiple of 3. After generating the EHT PPDU, the STA may send the generated EHT PPDU to the AP. Correspondingly, the length indicated by the L-SIG field in the EHT PPDU received by the AP is equal to the length value indicated by the uplink length field plus 2. After receiving the EHT PPDU, the AP may return an acknowledgment frame to confirm that the AP has received the EHT PPDU. The STA herein is a STA supporting the 802.11be protocol or a STA supporting 11be. For ease of description, the STA supporting the 802.11be protocol is referred to as an EHT station below.

Optionally, a station supporting the 802.11ax protocol (for ease of description, the station supporting the 802.11ax protocol is referred to as an HE station below) may receive the trigger frame. After receiving the trigger frame, the HE station may set, based on the length value indicated by the uplink length field in the trigger frame, the length indicated by the L-SIG field in the HE TB PPDU to the length value indicated by the uplink length field. Therefore, the length indicated by the L-SIG field in the HE TB PPDU generated by the HE station is equal to the length value indicated by the uplink length field, that is, a multiple of 3 minus 2. After generating the HE TB PPDU, the HE station may send the generated HE TB PPDU to the AP. After receiving the HE TB PPDU, the AP may return an acknowledgment frame to confirm that the AP has received the HE TB PPDU.

It can be understood that, if a station supports both the 802.11be protocol and the 802.11ax protocol, when the station works by using the 802.11be protocol, the station is considered as an EHT station; and when the station works by using the 802.11ax protocol, the station is considered as an HE station. Alternatively, if a station supports both the 802.11be protocol and the 802.11ax protocol, the station is considered as an EHT station. Optionally, when a station supports both the 802.11be protocol and the 802.11ax protocol, the station may determine, based on an indication of the AP in the trigger frame, a specific type of PPDU that the station is to send to respond to the trigger frame. The indication may be explicit. For example, a user information field in the trigger frame carries PPDU indication information used to indicate a PPDU format used by the station to respond to the trigger frame. For example, when a value of the PPDU indication information is 1, it indicates that the PPDU format used by the station to respond to the trigger frame is an EHT PPDU; and when the value of the PPDU indication information is 0, it indicates that the PPDU format used by the station to respond to the trigger frame is an HE TB PPDU. Alternatively, 1 indicates an HE TB PPDU, and 0 indicates an EHT PPDU. The indication may alternatively be implicit. For example, after the station receives the trigger frame, if an AID of the station is found before a user information field corresponding to AID 12=4095 (for example, a user information field that is in FIG. 5 and that corresponds to a STA 6), the station determines to send an HE TB PPDU to respond to the trigger frame; or if the AID of the station is found after the user information field corresponding to AID 12=4095 (for example, the user information field that is in FIG. 5 and that corresponds to the STA 6), the station determines to send an EHT PPDU to respond to the trigger frame.

It can be understood that, regardless of an HE TB PPDU or an EHT PPDU, there is a length (length) subfield and a rate (rate) subfield in an L-SIG field of a preamble. A transmit end indirectly indicates originally determined transmission duration of a PPDU by using the length subfield and the rate subfield in the L-SIG field. The rate subfield is fixedly set to 6 megabits per second (Megabits per second, Mbps). Because the rate subfield is set to a fixed value, the originally determined transmission duration of the PPDU is indirectly indicated by using the length subfield. Optionally, in this embodiment of this application, an implementation of a length indicated by the L-SIG field is a length indicated by the length subfield in the L-SIG field.

A calculation formula of a length (Length) value indicated by the length subfield is the following Formula (1-1):

$$\text{Length} = \left\lceil \frac{TXTIME - SignalExtension - 20}{4} \right\rceil \times 3 - 3 - m \quad (1\text{-}1)$$

In Formula (1-1), SignalExtension (signal extension) is a parameter related to a transmission frequency band. When a station works at 2.4 GHz, the parameter is 6 μs (microseconds); and when the station works at 5 GHz or 6 GHz, the parameter is 0 μs. TXTIME represents originally determined transmission duration of an entire PPDU. For an HE TB PPDU, a length of TXTIME is determined by the AP. For an HE PPDU, a value of m is 1 or 2, and a specific value of m depends on a specific HE PPDU type. For the HE TB PPDU, m=2. For an EHT PPDU, m=0 is set to distinguish the EHT PPDU from an HE PPDU in a process of performing automatic detection by a receive end.

It can be understood that, $\lceil A \rceil$ represents rounding up on a value A. For example, if A is equal to 3.2, $\lceil A \rceil$ is equal to 4. For another example, if A is equal to 5.8, $\lceil A \rceil$ is equal to 6.

For the HE TB PPDU, a length value indicated by a length subfield is specified by a trigger frame sent by the AP, and the length value may be calculated according to Formula (1-1). In uplink multiple user (multiple user, MU) transmission, it needs to be ensured that sending duration of a plurality of users (or STAs) is the same. Therefore, a same uplink length needs to be indicated for all STAs (or users) in a common information field in the trigger frame. An HE station may directly set a length indicated by an L-SIG field in the HE TB PPDU to a value indicated by an uplink length field in the trigger frame. For a trigger frame in 11be, to avoid impact on receiving the trigger frame by the HE station and setting, by the HE station, the length indicated by the L-SIG field in the HE TB PPDU, a value of an uplink length field in the trigger frame in 11be is still set according to Formula (1-1), and m=2. For an EHT station, a length value indicated by an L-SIG field in the EHT PPDU is a multiple of 3, because m=0 for the EHT PPDU. Therefore, after the EHT station reads an indication of the uplink length field in the trigger frame, during setting of a length indicated by the L-SIG field in the EHT PPDU, the length is set to the value indicated by the uplink length field plus 2.

Optionally, the HE STA may calculate a length of each field in the HE TB PPDU sent by the HE STA, and the EHT STA may also calculate a length of each field in the EHT PPDU sent by the EHT STA. For preambles in the HE TB PPDU and the EHT PPDU, a length of each field may be determined based on an indication in a trigger frame sent by the AP. For data fields in the HE TB PPDU and the EHT PPDU, a quantity of data symbols may be calculated according to Formula (1-2):

$$N_{SYM} = \left\lceil \left( \frac{\text{LENGTH} + m + 3}{3} \times 4 - T_{HE-PREAMBLE} - N_{MA} N_{HE-LTF} T_{HE-LTF-SYM} \right) / T_{SYM} \right\rceil - b_{PE-Disambiguity} \quad (1-2)$$

In Formula (1-2), LENGTH represents length information (that is, a length value) indicated by an L-SIG field in an uplink PPDU (which is an HE TB PPDU or an EHT PPDU herein), and is derived by using the value indicated by the uplink length field in the trigger frame. For the HE TB PPDU, m=2 in Formula (1-2); and for the EHT PPDU, m=0 in Formula (1-2). $T_{HE-PREAMBLE}$ is a preamble length from an RL-SIG field to a high efficient long training sequence field (High Efficient Long Training Field, HE-LTF) in the HE TB PPDU, and includes a length (fixed to four microseconds) of the RL-SIG, a length (fixed to eight microseconds) of a high efficient signal field A (High Efficient Signal Field A, HE-SIG-A), a length (fixed to 8 microseconds) of a high efficient short training sequence field (High Efficient Short Training Field, HE-STF), and a length of the HE-LTF ($N_{HE-LTF}*T_{HE-LTF-SYM}$). A quantity of symbols in the HE-LTF (High Efficient Long Training Field, high efficient long training sequence field), a size of the HE-LTF, and a guard interval length are all indicated by the trigger frame, and a length of the HE-LTF symbol may be obtained by using the size of the HE-LTF and the guard interval length.

For the EHT PPDU, $T_{HE-PREAMBLE}$ may be replaced with $T_{EHT-PREAMBLE}$, and $N_{HE-LTF}*T_{HE-LTF-SYM}$ may be replaced with $N_{EHT-LTF}*T_{EHT-LTF-SYM}$. $T_{EHT-PREAMBLE}$ is a preamble length from an RL-SIG to an EHT-LTF in the EHT PPDU.

For an EHT TB PPDU, $T_{EHT-PREAMBLE}$ includes a length of an RL-SIG, a length (fixed to eight microseconds) of a U-SIG, a length (fixed to eight microseconds) of an EHT-STF, and a length of an EHT-LTF (similar to the HE-LTF, $N_{EHT-LTF}*T_{EHT-LTF-SYM}$). For an EHT SU PPDU, $T_{EHT-PREAMBLE}$ includes a length of an RL-SIG, a length of a U-SIG, a length ($N_{EHT-SIG}*T_{EHT-SIG}$, where $T_{EHT-SIG}$ is fixed to four microseconds, and $N_{EHT-SIG}$ is determined by a transmit end of the EHT SU PPDU) of an extremely high throughput signal field (Extremely High Throughput Signal Field, EHT-SIG), a length (fixed to four microseconds) of an EHT-STF, and a length of an EHT-LTF (similar to the HE-LTF, $N_{EHT-LTF}*T_{EHT-LTF-SYM}$).

$N_{MA}$ is a quantity of midambles in a Doppler scenario, and a calculation formula thereof is Formula (1-3), and Doppler represents a Doppler bit indication and is obtained by an indication in the trigger frame. $b_{PE-Disambiguity}$ represents a data packet extension disambiguity (Disambiguity) bit indication, and is obtained by an indication in the trigger frame. $T_{SYM}$ represents duration of a data symbol, and is obtained based on a guard interval indicated in the trigger frame. It can be understood that, in the EHT PPDU, $T_{HE-PREAMBLE}$ in Formula (1-3) may be replaced with $T_{EHT-PREAMBLE}$.

$$N_{MA} = \begin{cases} 0 & \text{Doppler} = 0 \\ \max\left(0, \left\lceil \left(\frac{\text{LENGTH} + 3 + m}{3} \times 4 - T_{HE-PREAMBLE} - (b_{PE-Disambiguity} + 2) \cdot T_{SYM}\right) / T_{MA} \right\rceil \right) & \text{Doppler} = 1 \end{cases} \quad (1-3)$$

For packet extension fields in the HE TB PPDU and the EHT PPDU, a packet extension length in the HE TB PPDU is shown in Formula (1-4):

$$T_{PE} = \left\lceil \frac{\left(\frac{\text{LENGTH} + m + 3}{3} \times 4 - T_{HE-PREAMBLE}\right) - N_{SYM}T_{SYM} - N_{MA}N_{HE-LTF}T_{HE-LTF-SYM}}{4} \right\rceil \times 4 \quad (1-4)$$

In Formula (1-3), $T_{MA}$ represents duration of a midamble, and is the same as duration of an HE-LTF or an EHT-LTF. Max{A, B} represents that a larger value between A and B is used. $\lceil A \rceil$ represents rounding up on a value A. For example, if A is equal to 4.3, $\lceil A \rceil$ is equal to 4. For another example, if A is equal to 5.9, $\lceil A \rceil$ is equal to 5.

It can be understood that, a packet extension length in the EHT PPDU may also be obtained through calculation with reference to Formula (1-4), where $T_{HE-PREAMBLE}$ is replaced with $T_{EHT-PREAMBLE}$, and $N_{HE-LTF}*T_{HE-LTF-SYM}$ is replaced with $N_{EHT-LTF}*T_{EHT-LTF-SYM}$.

It can be learned that, in this embodiment of this application, the uplink length field in the trigger frame is used to indicate the lengths indicated by the L-SIG fields in the EHT PPDU and the HE TB PPDU or indicate the length indicated by the L-SIG field in the EHT PPDU. In this way, both an EHT station and an HE station can be scheduled to perform uplink data transmission, thereby reducing instruction overheads. In addition, the trigger frame in this embodiment of this application is a trigger frame of 11ax. This can avoid impact on receiving the trigger frame by the HE station and a method for setting the length indicated by the L-SIG field in the HE TB PPDU. Moreover, in this embodiment of this application, the value indicated by the uplink length field in the trigger frame is set to a multiple of 3 minus 2, and the length indicated by the L-SIG field in the EHT TB PPDU is set to the value indicated by the uplink length field plus 2, to ensure that the length indicated by the L-SIG field in the EHT TB PPDU is a multiple of 3. In this way, the EHT TB PPDU can be automatically detected and can be distinguished from the HE PPDU.

Embodiment 2

A method for indicating an uplink bandwidth of an EHT PPDU is mainly described in Embodiment 2 of this application. It can be understood that, in actual application, Embodiment 2 of this application may be implemented in combination with Embodiment 1, or may be implemented separately. This is not limited in this embodiment of this application.

It can be understood that, in terms of a bandwidth configuration, 802.11ax supports the following bandwidth configurations: 20 MHz, 40 MHz, 80 MHz, and 160 MHz/80 MHz+80 MHz. A difference between 160 MHz and 80+80 MHz lies in that the former is a continuous frequency band, while two 80-MHz bandwidths of the latter are discontinuous or discrete in a frequency band. In 802.11be, a bandwidth configuration such as 320 MHz/160 MHz+160 MHz is further supported. Therefore, an uplink bandwidth during uplink scheduling needs to be indicated for a station that works in the 802.11be protocol.

Figure 7:
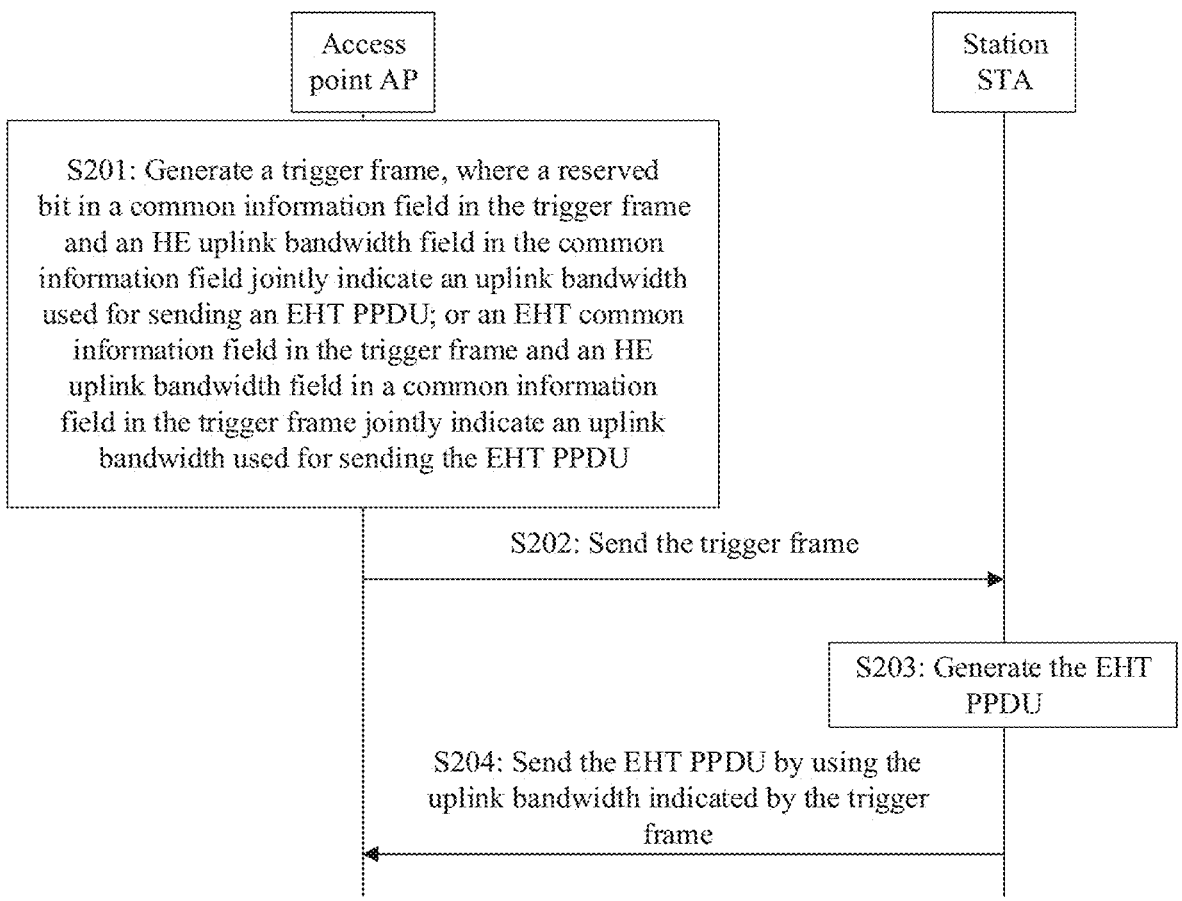
FIG. 7 is another schematic flowchart of a method for indicating an uplink parameter of a PPDU according to an embodiment of this application.

FIG. 7 is another schematic flowchart of a method for indicating an uplink parameter of a PPDU according to an embodiment of this application. The method for indicating an uplink parameter of a PPDU is described by using an example in which the method is implemented in a communications system including one AP and one or more STAs. The AP supports the IEEE 802.11be protocol (also referred to as Wi-Fi 7 or the EHT protocol), and may further support another WLAN communications protocol, for example, the IEEE 802.11ax protocol and the IEEE 802.11ac protocol. At least one of the one or more STAs supports the IEEE 802.11be protocol. It should be understood that, the AP and the STA in this embodiment of this application may further support a next-generation protocol of IEEE 802.11be. In other words, the method for indicating an uplink parameter of a PPDU provided in this embodiment of this application not only is applicable to the IEEE 802.11be protocol, but also is applicable to the next-generation protocol of IEEE 802.11be. As shown in FIG. 7, the method for indicating an uplink parameter of a PPDU includes but is not limited to the following steps.

S201: The AP generates a trigger frame, where a reserved bit in a common information field in the trigger frame and an HE uplink bandwidth field in the common information field jointly indicate an uplink bandwidth used for sending an EHT PPDU; or an EHT common information field in the trigger frame and an HE uplink bandwidth field in a common information field in the trigger frame jointly indicate an uplink bandwidth used for sending the EHT PPDU.

S202: The AP sends the trigger frame. Correspondingly, the STA receives the trigger frame.

For a frame format of the trigger frame, refer to FIG. 3a, and the trigger frame includes a common information field and a user information list field. For a frame format of the common information field and the user information list field, refer to FIG. 5. The trigger frame may indicate both an uplink bandwidth used for sending an HE TB PPDU and the uplink bandwidth used for sending the EHT PPDU.

Specifically, the common information field in the front of the trigger frame still indicates an uplink bandwidth for an HE STA. In other words, an HE uplink bandwidth field in the common information field in the front of the trigger frame is used to indicate the uplink bandwidth used for sending the HE TB PPDU. A meaning of the HE uplink bandwidth field is the same as a meaning of the field in 11ax. To be specific, values of the field are 00, 01, 10, and 11, respectively indicating that the uplink bandwidth is 20 MHz, 40 MHz, 80 MHz, and 160 MHz/80+80 MHz. Another part of the trigger frame, for example, the reserved bit in the common information field or the EHT common information field, includes an indication of the uplink bandwidth used for sending the EHT PPDU. In other words, the reserved bit in the common information field in the trigger frame and the HE uplink bandwidth field in the common information field may be used to jointly indicate the uplink bandwidth used for sending the EHT PPDU; or the EHT common information field in the trigger frame and the HE uplink bandwidth field in the common information field may be used to jointly indicate the uplink bandwidth used for sending the EHT PPDU. For ease of description, the uplink bandwidth used for sending the EHT PPDU is denoted as an EHT uplink bandwidth in the following: The following describes in detail an implementation of indicating the EHT uplink bandwidth.

(1) The HE uplink bandwidth field and the reserved bit in the common information field jointly indicate the EHT uplink bandwidth.

Figure 8A:
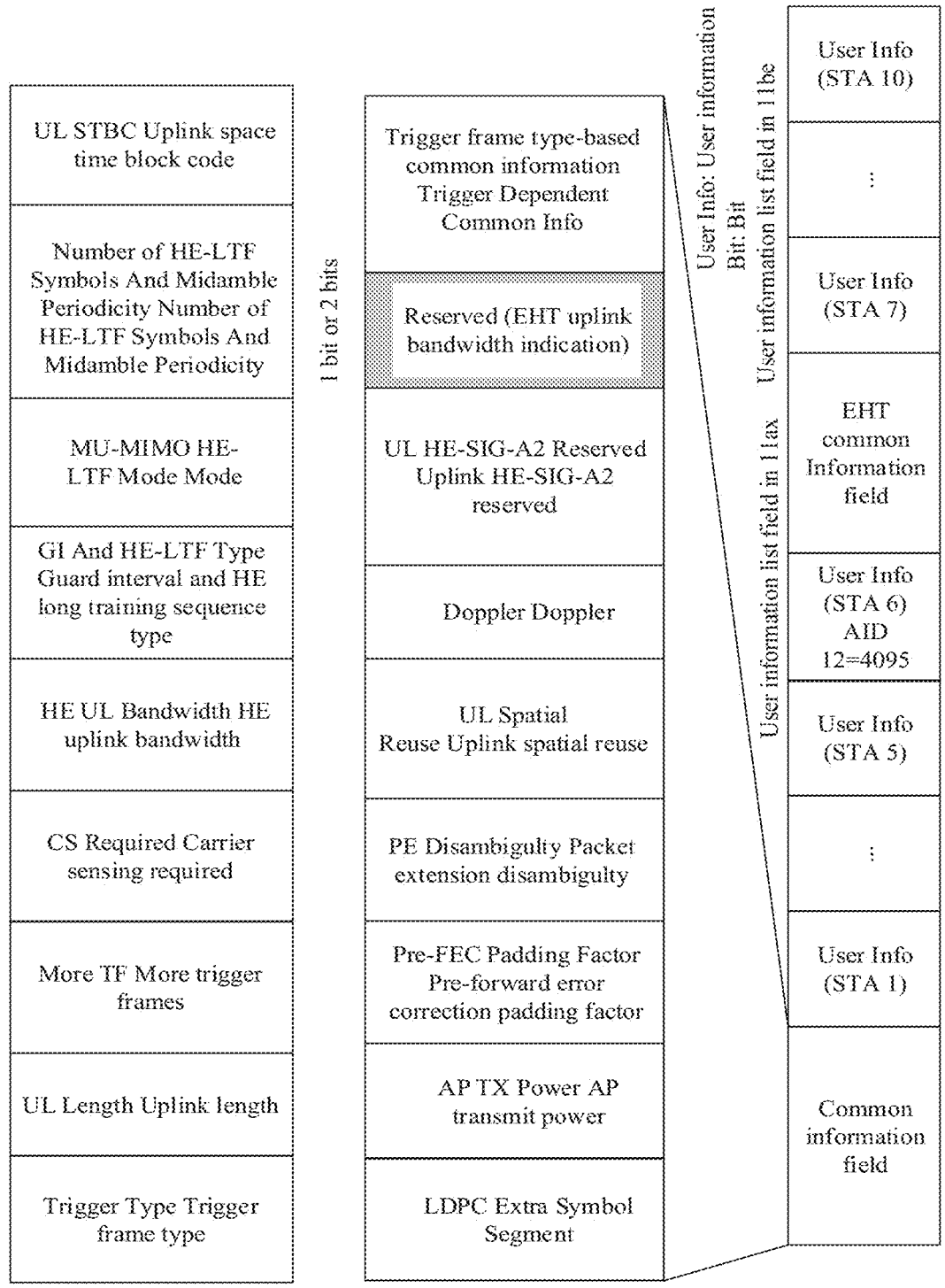
FIG. 8a is a schematic diagram of a frame format of an EHT uplink bandwidth indication according to an embodiment of this application.

FIG. 8a is a schematic diagram of a frame format of an EHT uplink bandwidth indication according to an embodiment of this application. As shown in FIG. 8a, the indication of the EHT uplink bandwidth is placed in the reserved bit in the common information field.

In a first implementation, one reserved bit (that is, 1-bit reserved bit) in the common information field is used for indication. Specifically, if the reserved bit is 0, it indicates that the EHT uplink bandwidth is the same as a bandwidth indicated by the HE uplink bandwidth field; and if the reserved bit is 1, it indicates that the EHT uplink bandwidth is 320 MHz. It can be understood that, in this embodiment of this application, a correspondence/mapping relationship between a value and a meaning of the reserved bit is not limited. Alternatively, when the reserved bit is 1, it indicates that the EHT uplink bandwidth is the same as the bandwidth indicated by the HE uplink bandwidth field; and when the reserved bit is 0, it indicates that the EHT uplink bandwidth is 320 MHz.

In a second implementation, two reserved bits (that is, 2-bit reserved bits) in the common information field are used for indication. Specifically, if values of the two reserved bits are 00, it indicates that the EHT uplink bandwidth is the same as the bandwidth indicated by the HE uplink bandwidth field; and if the values of the two reserved bits are 01, it indicates that the EHT uplink bandwidth is 320 MHz. If the values of the two reserved bits are 10 and 11, the two reserved bits indicate reserved.

It can be understood that, in this embodiment of this application, a correspondence/mapping relationship between values and a meaning of the two reserved bits is not limited, and various different mapping sequences may alternatively be used. For example, when the values are 00, it indicates that the EHT uplink bandwidth is the same as the bandwidth indicated by the HE uplink bandwidth field, and when the values are 11, it indicates that the EHT uplink bandwidth is 320 MHz; alternatively, when the values are 11, it indicates that the EHT uplink bandwidth is the same as the bandwidth indicated by the HE uplink bandwidth field; when the values are 00, it indicates that the EHT uplink bandwidth is 320 MHz; and when the values are the other values 10 and 01, the two reserved bits indicate reserved. For another example, when the values are 10, it indicates that the EHT uplink bandwidth is the same as the bandwidth indicated by the HE uplink bandwidth field; when the values are 11, it indicates that the EHT uplink bandwidth is 320 MHz; and when the values are the other values 00 and 01, the two reserved bits indicate reserved. Various different mapping sequences are not enumerated herein in this application.

In a third implementation, two reserved bits (that is, 2-bit reserved bits) in the common information field are still used for indication. Specifically, if values of the two reserved bits are 00, it indicates that the EHT uplink bandwidth is the same as the bandwidth indicated by the HE uplink bandwidth field; if the values of the two reserved bits are 01, it indicates that the EHT uplink bandwidth is 160 MHz; and if the values of the two reserved bits are 10, it indicates that the EHT uplink bandwidth is 320 MHz. When the values of the two reserved bits are 11, the two reserved bits indicate reserved.

It can be understood that, in this embodiment of this application, a correspondence/mapping relationship between the values and a meaning of the two reserved bits is not limited, and another mapping sequence may alternatively be used. For example, when the values are 11, it indicates that the EHT uplink bandwidth is the same as the bandwidth indicated by the HE uplink bandwidth field; when the values are 10, it indicates that the EHT uplink bandwidth is 160 MHz; when the values are 01, it indicates that the EHT uplink bandwidth is 320 MHz; and when the values are the remaining values 00, the two reserved bits indicate reserved.

It can be learned that, in the first implementation and the second implementation, if there is a need to indicate that the EHT uplink bandwidth is 160 MHz, the bandwidth indicated by the HE uplink bandwidth field needs to be set to 160 MHz. In the third implementation, if there is a need to indicate that the EHT uplink bandwidth is 160 MHz, the bandwidth indicated by the HE uplink bandwidth field does not need to be set to 160 MHz, but only a bandwidth indicated by the reserved bits needs to be set to 160 MHz. In this way, the bandwidth indicated by the HE uplink bandwidth field is more flexible, so that the uplink bandwidth used for sending the HE TB PPDU can be flexibly indicated. This reduces a transmit bandwidth of an HE station and reduces power consumption of the HE station.

(2) The HE uplink bandwidth field and the EHT common information field jointly indicate the EHT uplink bandwidth.

Figure 8B:
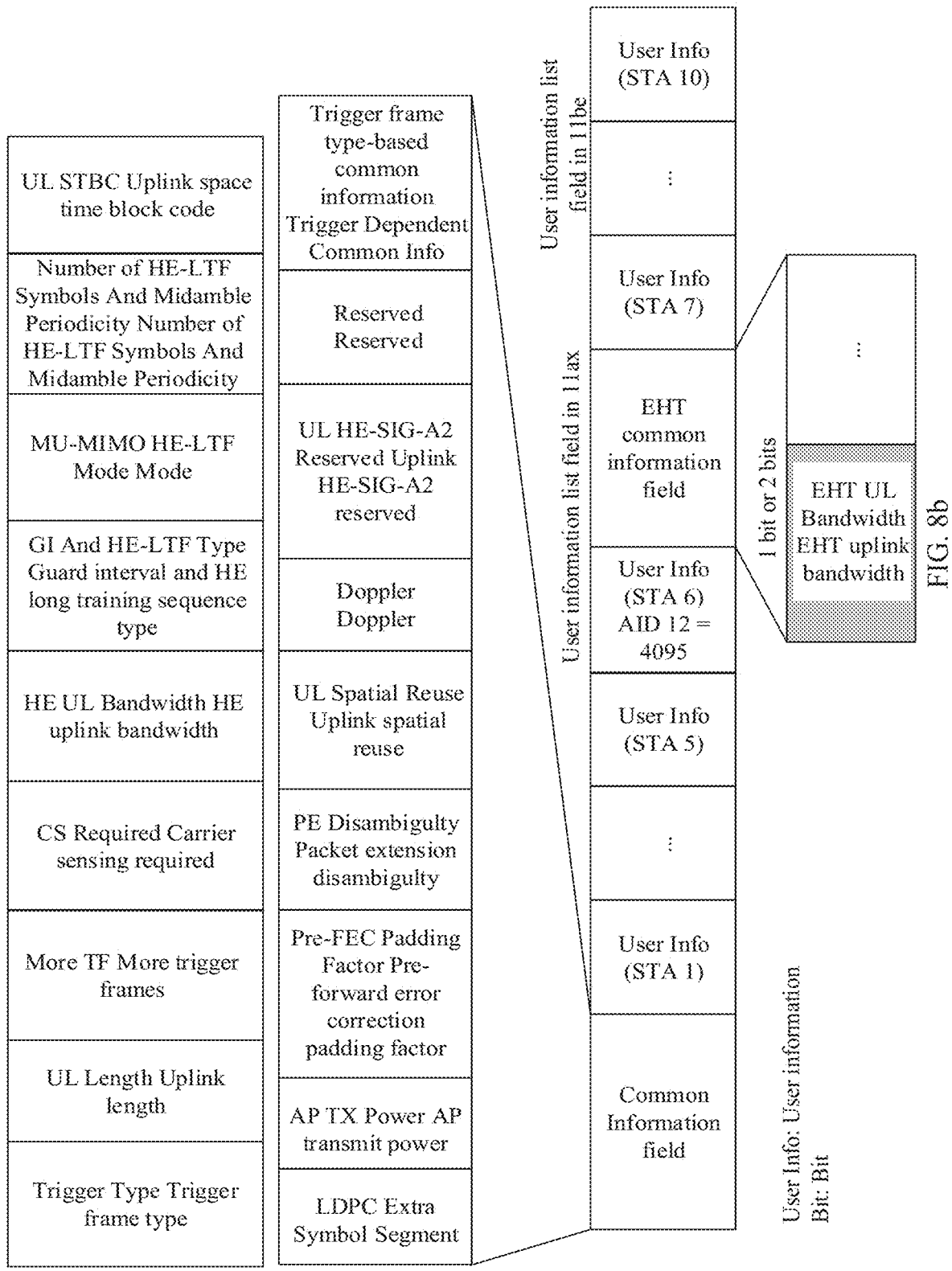
FIG. 8b is a schematic diagram of another frame format of an EHT uplink bandwidth indication according to an embodiment of this application.

FIG. 8*b* is a schematic diagram of another frame format of an EHT uplink bandwidth indication according to an embodiment of this application. As shown in FIG. 8*b*, the EHT common information field includes an EHT uplink bandwidth field, which may also be referred to as a be uplink bandwidth field. A location of the EHT uplink bandwidth field in the EHT common information field and a quantity of bits occupied by the EHT uplink bandwidth field are not limited in this embodiment of this application.

In a fourth implementation, the EHT uplink bandwidth field is 1 bit. Specifically, if a value of the EHT uplink bandwidth field is 0, it indicates that the EHT uplink bandwidth is the same as the bandwidth indicated by the HE uplink bandwidth field; and if the value of the EHT uplink bandwidth field is 1, it indicates that the EHT uplink bandwidth is 320 MHz. It can be understood that, in this embodiment of this application, a correspondence between a value and a meaning of the EHT uplink bandwidth field is not limited. Alternatively, when the value of the EHT uplink bandwidth field is 1, it indicates that the EHT uplink bandwidth is the same as the bandwidth indicated by the HE uplink bandwidth field; and when the value of the EHT uplink bandwidth field is 0, it indicates that the EHT uplink bandwidth is 320 MHz.

In a fifth implementation, the EHT uplink bandwidth field is 2 bits. Specifically, if a value of the EHT uplink bandwidth field is 00, it indicates that the EHT uplink bandwidth is the same as the bandwidth indicated by the HE uplink bandwidth field; and if the value of the EHT uplink bandwidth field is 01, it indicates that the EHT uplink bandwidth is 320 MHz. When the value of the EHT uplink bandwidth field is 10 and 11, the EHT uplink bandwidth field indicates reserved.

It can be understood that, in this embodiment of this application, a correspondence between the value and a meaning of the EHT uplink bandwidth field is not limited, and various different mapping sequences may alternatively be used. For example, when the value is 00, it indicates that the EHT uplink bandwidth is the same as the bandwidth indicated by the HE uplink bandwidth field, and when the value is 11, it indicates that the EHT uplink bandwidth is 320 MHz; alternatively, when the value is 11, it indicates that the EHT uplink bandwidth is the same as the bandwidth indicated by the HE uplink bandwidth field; when the value is 00, it indicates that the EHT uplink bandwidth is 320 MHz; and when the value is the other values 10 and 01, the EHT uplink bandwidth field indicates reserved. For another example, when the value is 10, it indicates that the EHT uplink bandwidth is the same as the bandwidth indicated by the HE uplink bandwidth field; when the value is 11, it indicates that the EHT uplink bandwidth is 320 MHz; and when the value is the other values 00 and 01, the two reserved bits indicate reserved. Various different mapping sequences are not enumerated herein in this application.

In a sixth implementation, the EHT uplink bandwidth field is still 2 bits. Specifically, if a value of the EHT uplink bandwidth field is 00, it indicates that the EHT uplink bandwidth is the same as the bandwidth indicated by the HE uplink bandwidth field; if the value of the EHT uplink bandwidth field is 01, it indicates that the EHT uplink bandwidth is 160 MHz; and if values of the two reserved bits are 10, it indicates that the EHT uplink bandwidth is 320 MHz. When the value of the EHT uplink bandwidth field is 11, the EHT uplink bandwidth field indicates reserved.

It can be understood that, in this embodiment of this application, a correspondence between the value and a meaning of the EHT uplink bandwidth field is not limited, and another mapping sequence may alternatively be used. For example, when the value is 11, it indicates that the EHT uplink bandwidth is the same as the bandwidth indicated by the HE uplink bandwidth field; when the value is 10, it indicates that the EHT uplink bandwidth is 160 MHz; when the value is 01, it indicates that the EHT uplink bandwidth is 320 MHz; and when the value is the remaining value 00, the two reserved bits indicate reserved.

Same as the foregoing first implementation and the foregoing second implementation, in the fourth implementation and the fifth implementation, if there is a need to indicate that the EHT uplink bandwidth is 160 MHz, the bandwidth indicated by the HE uplink bandwidth field needs to be set to 160 MHz. In the sixth implementation, if there is a need to indicate that the EHT uplink bandwidth is 160 MHz, the bandwidth indicated by the HE uplink bandwidth field does not need to be set to 160 MHz, but only a bandwidth indicated by the EHT uplink bandwidth field needs to be set to 160 MHz. In this way, the bandwidth indicated by the HE uplink bandwidth field is more flexible, so that the uplink bandwidth used for sending the HE TB PPDU can be flexibly indicated. This reduces a transmit bandwidth of an HE station and reduces power consumption of the HE station.

S203: The STA generates the EHT PPDU.

S204: The STA sends the EHT PPDU by using the uplink bandwidth indicated by the trigger frame.

Specifically, after generating the EHT PPDU, the STA may send the generated EHT PPDU by using the uplink bandwidth indicated by the trigger frame. After receiving the EHT PPDU, the AP may return an acknowledgment frame to the STA. For example, if the uplink bandwidth that is used for sending the EHT PPDU and that is indicated by the trigger frame is 80 MHz, the STA sends the EHT PPDU by using an 80-MHz bandwidth. For another example, if the uplink bandwidth that is used for sending the EHT PPDU and that is indicated by the trigger frame is 320 MHz, the STA sends the EHT PPDU by using a 320-MHz bandwidth. The STA herein is a STA supporting the 802.11be protocol.

Optionally, a station supporting the 802.11ax protocol may also receive the trigger frame; and after receiving the trigger frame, the station may generate an HE TB PPDU, and then send the HE TB PPDU by using the uplink bandwidth indicated by the HE uplink bandwidth field in the common information field in the trigger frame. After receiving the HE TB PPDU, the AP may return an acknowledgment frame to the station. For example, if the uplink bandwidth indicated by the HE uplink bandwidth field is 20 MHz, the HE STA sends the HE TB PPDU by using a 20-MHz bandwidth. For another example, if the uplink bandwidth indicated by the HE uplink bandwidth field is 160 MHz, the HE STA sends the HE TB PPDU by using a 160-MHz bandwidth.

It can be understood that, the method in this embodiment of this application may be used to only schedule the station supporting the 802.11be protocol to send the uplink EHT PPDU, or may be used to simultaneously schedule the station supporting the 802.11be protocol to send the uplink EHT PPDU and schedule the station supporting the 802.11ax protocol to send the uplink HE TB PPDU.

It can be learned that, in this embodiment of this application, based on reuse of an indication of the HE uplink bandwidth field in the trigger frame in 11ax, fewer bits are used to indicate the uplink bandwidth (that is, the EHT uplink bandwidth) used for sending the EHT PPDU. Compared with a manner in which 3 bits are directly used to indicate the uplink bandwidth used for sending the EHT PPDU, this manner reduces overheads.

Embodiment 3

In Embodiment 3 of this application, a method for indicating a quantity of EHT-LTF symbols is mainly described. It can be understood that, in actual application, Embodiment 3 of this application may be implemented in combination with Embodiment 1, implemented in combination with Embodiment 2, or implemented in combination with Embodiment 1 and Embodiment 2. Embodiment 3 of this application may alternatively be separately implemented. This is not limited in this embodiment of this application.

Figure 9:
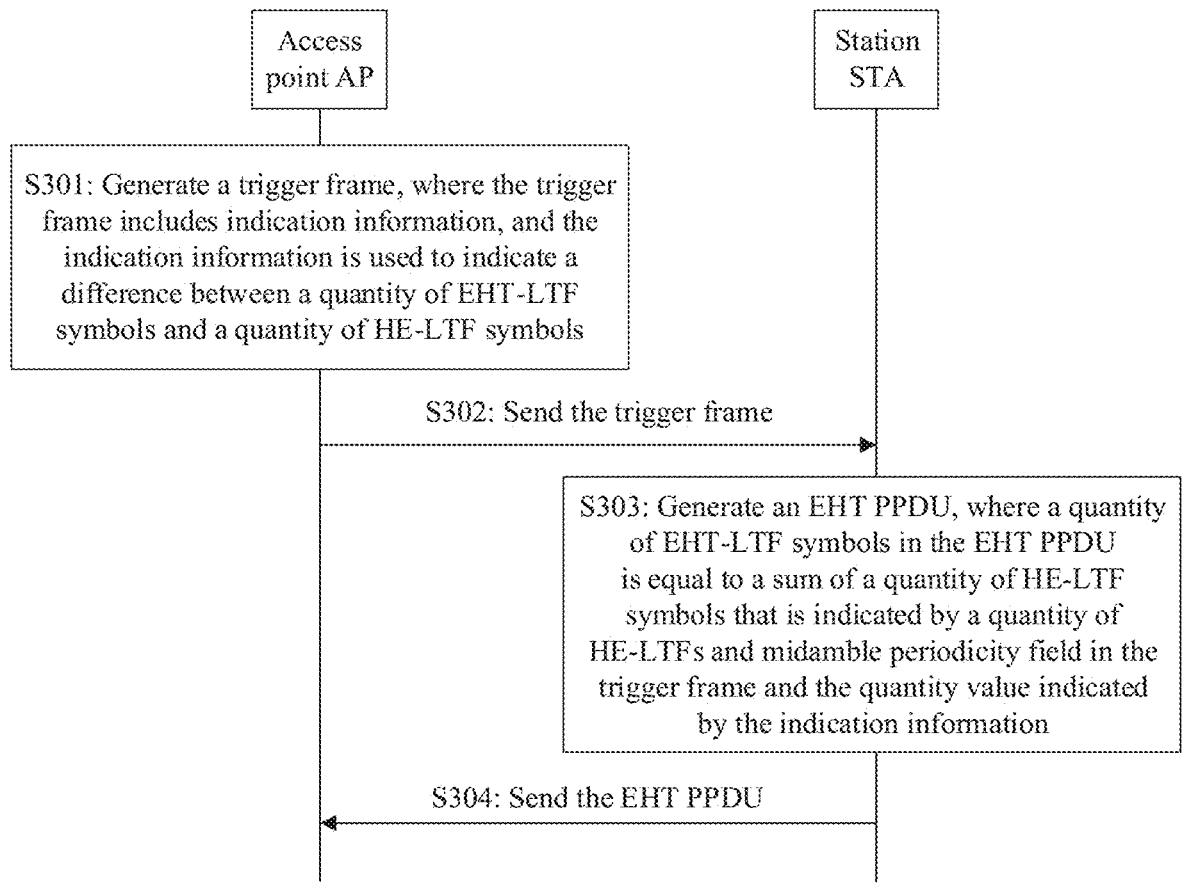
FIG. 9 is still another schematic flowchart of a method for indicating an uplink parameter of a PPDU according to an embodiment of this application.

FIG. 9 is still another schematic flowchart of a method for indicating an uplink parameter of a PPDU according to an embodiment of this application. The method for indicating an uplink parameter of a PPDU is described by using an example in which the method is implemented in a communications system including one AP and one or more STAs. The AP supports the IEEE 802.11be protocol (also referred to as Wi-Fi 7 or the EHT protocol), and may further support another WLAN communications protocol, for example, the IEEE 802.11ax protocol and the IEEE 802.11ac protocol. At least one of the one or more STAs supports the IEEE 802.11be protocol. It should be understood that, the AP and the STA in this embodiment of this application may further support a next-generation protocol of IEEE 802.11be. In other words, the method for indicating an uplink parameter of a PPDU provided in this embodiment of this application not only is applicable to the IEEE 802.11be protocol, but also is applicable to the next-generation protocol of IEEE 802.11be.

As shown in FIG. 9, the method for indicating an uplink parameter of a PPDU includes but is not limited to the following steps.

S301: The AP generates a trigger frame, where the trigger frame includes indication information, and the indication information is used to indicate a difference between a quantity of EHT-LTF symbols and a quantity of HE-LTF symbols.

S302: The AP sends the trigger frame. Correspondingly, the STA receives the trigger frame.

For a frame format of the trigger frame, refer to FIG. 3a, and the trigger frame includes a common information field and a user information list field. For a frame format of the common information field and the user information list field, refer to FIG. 5. The trigger frame includes the indication information, and the indication information may be used to indicate the difference between the quantity of EHT-LTF symbols and the quantity of HE-LTF symbols. In other words, based on the quantity of HE-LTF symbols and a quantity of HE-LTF symbols that is indicated by an intermediate code periodicity field, the indication information may be used to indicate a quantity of symbols that the quantity of HE-LTF symbols is more than the quantity of EHT-LTF symbols. It can be understood that, one to eight HE-LTF symbols are supported in the 802.11ax standard, and one to 16 EHT-LTF symbols are supported in the 802.11be standard. Therefore, when there are both an HE TB PPDU and an EHT PPDU in uplink transmission, to prevent adjacent-band interference resulting from non-orthogonality caused by misalignment between symbols, symbol alignment between the HE TB PPDU and the EHT PPDU needs to be performed.

Optionally, a sum of quantities of EHT-LTF symbols and EHT data symbols is equal to a sum of quantities of HE-LTF symbols and HE data symbols.

Figure 10:
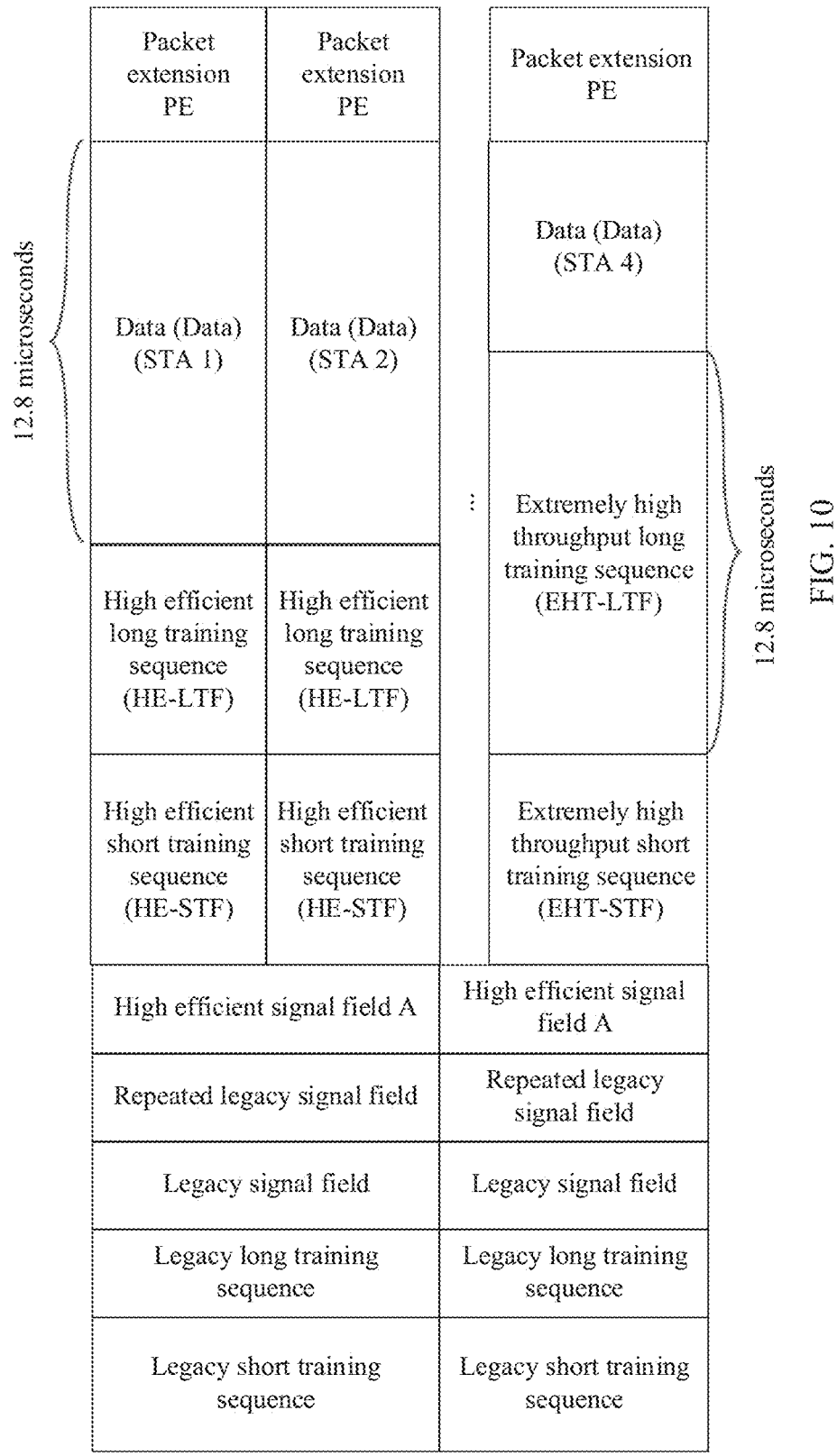
FIG. 10 is a schematic diagram in which a size of an EHT-LTF is the same as a size of HE data according to an embodiment of this application.

Optionally, in this embodiment of this application, a size of an EHT-LTF is the same as a size of HE data. To be specific, the EHT-LTF and the HE data each have a length of 12.8 microseconds that does not include a guard interval part; in other words, the size of the HE data is fixed and is 12.8 microseconds. In this way, if guard interval lengths are still the same, symbol alignment between the EHT-LTF and the HE data can still be ensured. FIG. 10 is a schematic diagram in which a size of an EHT-LTF is the same as a size of HE data according to an embodiment of this application. As shown in FIG. 10, a time length of the EHT-LTF is equal to a time length of the HE data, and a sum of the time length of the EHT-LTF and a time length of an EHT data part is equal to a sum of a time length of the HE-LTF and a time length of an HE data part.

Optionally, the indication information may be carried in a reserved bit in the common information field in the trigger frame or carried in an EHT common information field in the trigger frame.

Figure 11A:
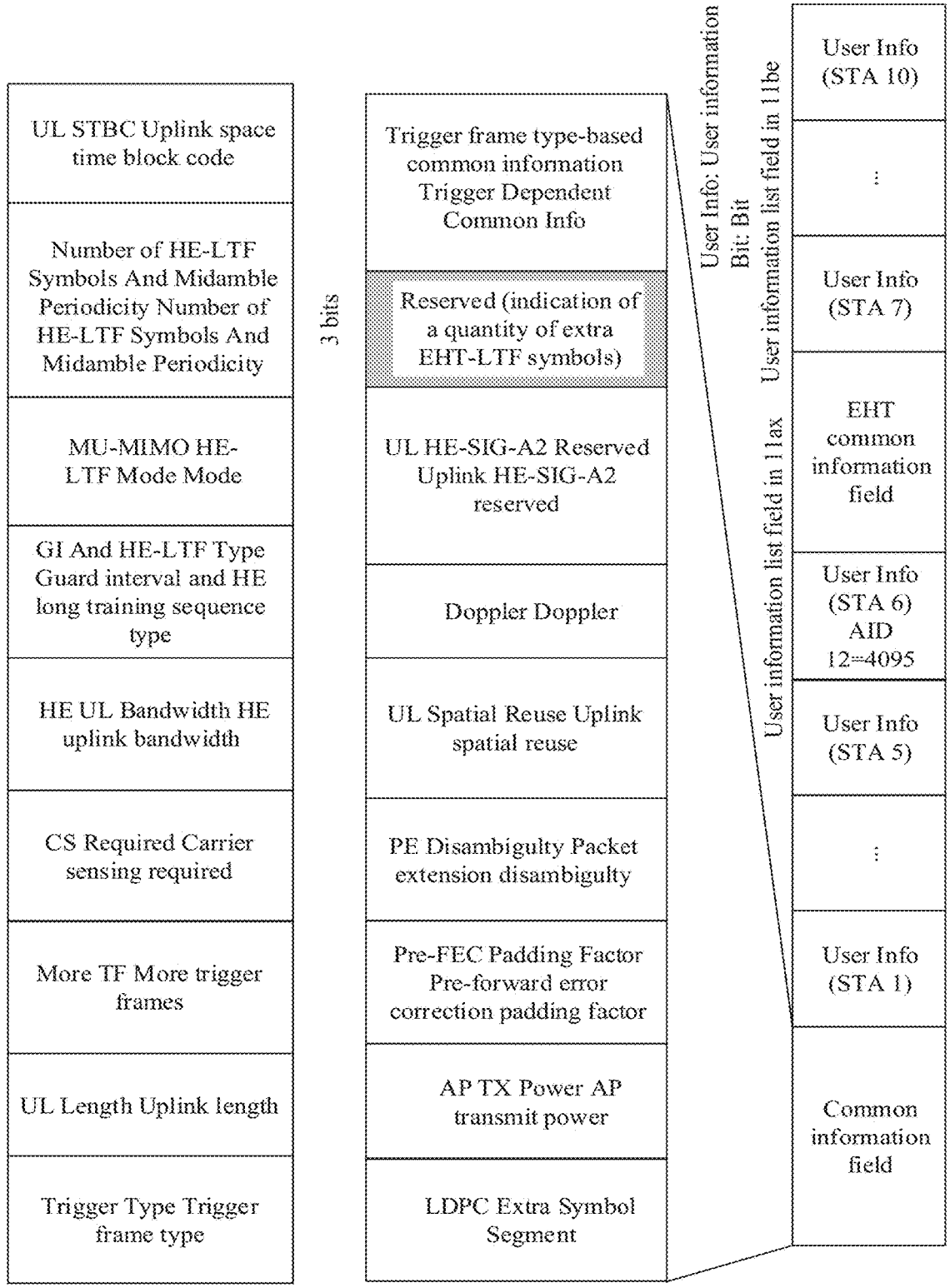
FIG. 11a is a schematic diagram of a frame format of an indication of a quantity of EHT-LTF symbols according to an embodiment of this application.

FIG. 11a is a schematic diagram of a frame format of an indication of a quantity of EHT-LTF symbols according to an embodiment of this application. As shown in FIG. 11a, the indication information is carried in a reserved bit in the common information field in the trigger frame, and an indication of a quantity of additional EHT-LTF symbols exists in the reserved bit, and indicates quantities 1 to 8 of additional EHT-LTF symbols. Specifically, three reserved bits (that is, 3-bit reserved bits) in the common information field may be used to indicate a difference between a quantity of EHT-LTF symbols and a quantity of HE-LTF symbols, or used to indicate quantities 1 to 8 of additional EHT-LTF symbols. For example, when values of the three reserved bits are 000, it indicates that the difference between the quantity of EHT-LTF symbols and the quantity of HE-LTF symbols is 1. When the values of the three reserved bits are 001, it indicates that the difference between the quantity of EHT-LTF symbols and the quantity of HE-LTF symbols is 2. When the values of the three reserved bits are 010, it indicates that the difference between the quantity of EHT-LTF symbols and the quantity of HE-LTF symbols is 3. When the values of the three reserved bits are 011, it indicates that the difference between the quantity of EHT-LTF symbols and the quantity of HE-LTF symbols is 4. When the values of the three reserved bits are 100, it indicates that the difference between the quantity of EHT-LTF symbols and the quantity of HE-LTF symbols is 5. When the values of the three reserved bits are 101, it indicates that the difference between the quantity of EHT-LTF symbols and the quantity of HE-LTF symbols is 6. When the values of the three reserved bits are 110, it indicates that the difference between the quantity of EHT-LTF symbols and the quantity of HE-LTF symbols is 7. When the values of the three reserved bits are 111, it indicates that the difference between the quantity of EHT-LTF symbols and the quantity of HE-LTF symbols is 8. It can be understood that, in this embodiment of this application, a correspondence between the values and a meaning of the three reserved bits in the common information field is not limited, and there may alternatively be another mapping relationship.

Figure 11B:
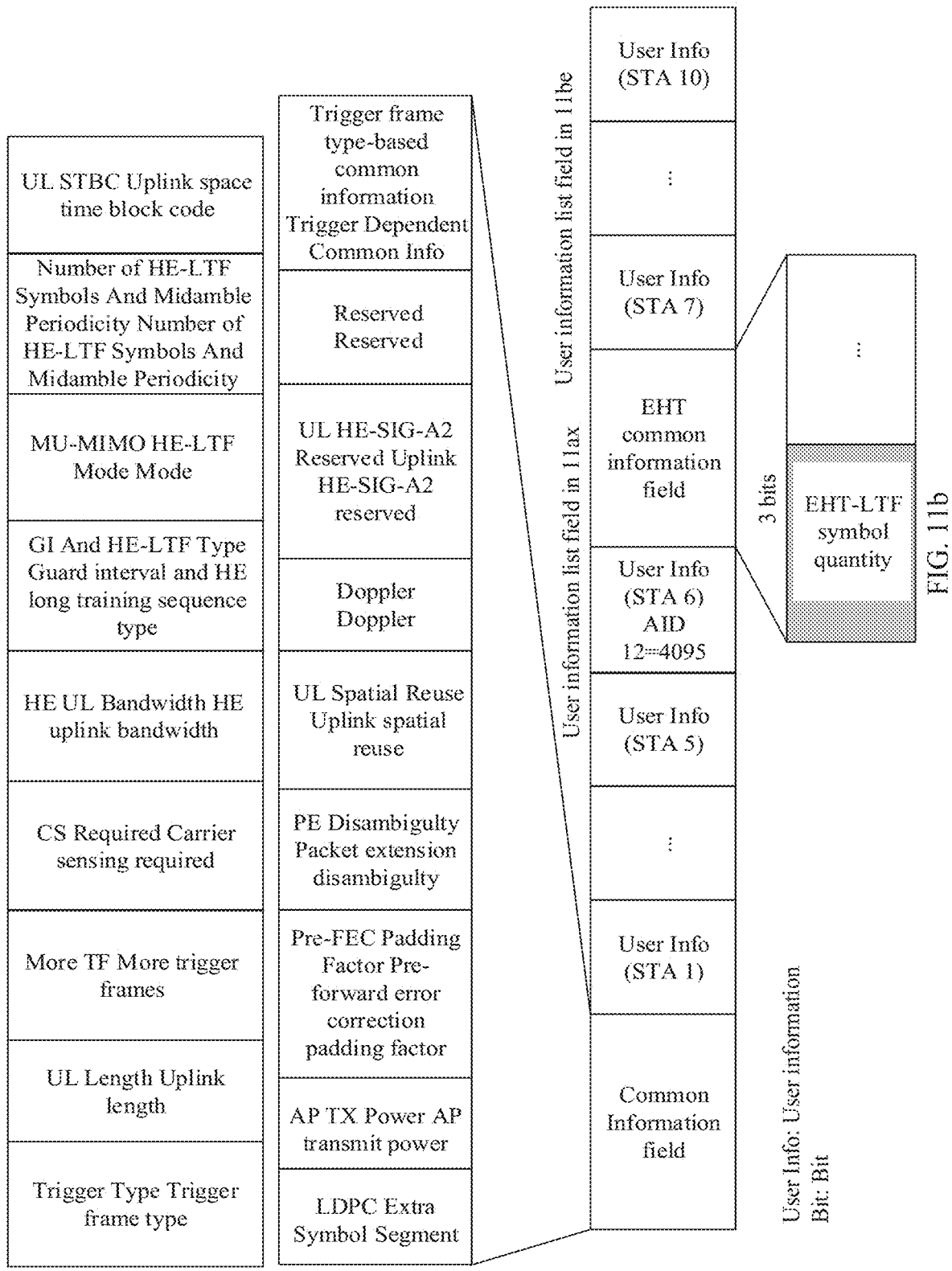
FIG. 11b is a schematic diagram of another frame format of an indication of a quantity of EHT-LTF symbols according to an embodiment of this application.

FIG. 11b is a schematic diagram of another frame format of an indication of a quantity of EHT-LTF symbols according to an embodiment of this application. As shown in FIG. 11b, the indication information is carried in the EHT common information field in the trigger frame. A specific location of the indication information in the EHT common information field and a quantity of bits occupied by the indication information are not limited in this embodiment of this application. Specifically, an indication of a quantity of additional EHT-LTF symbols exists in the EHT common information field, and indicates quantities 1 to 8 of additional EHT-LTF symbols. For example, the EHT common information field includes a field, and a length of the field may be three bits, and is used to indicate a difference between a quantity of EHT-LTF symbols and a quantity of HE-LTF symbols, or used to indicate quantities 1 to 8 of additional EHT-LTF symbols. The field may be referred to as an EHT-LTF symbol quantity field, an indication field of additional EHT-LTF symbols, or another name. A name of the field is not limited in this embodiment of this application. An EHT-LTF symbol quantity field is used as an example. When a value of the EHT-LTF symbol quantity field is 000, it indicates that the difference between the quantity of EHT-LTF symbols and the quantity of HE-LTF symbols is 1. When the value of the EHT-LTF symbol quantity field is 001, it indicates that the difference between the quantity of EHT-LTF symbols and the quantity of HE-LTF symbols is 2. When the value of the EHT-LTF symbol quantity field is 010, it indicates that the difference between the quantity of EHT-LTF symbols and the quantity of HE-LTF symbols is 3. When the value of the EHT-LTF symbol quantity field is 011, it indicates that the difference between the quantity of EHT-LTF symbols and the quantity of HE-LTF symbols is 4. When the value of the EHT-LTF symbol quantity field is 100, it indicates that the difference between the quantity of EHT-LTF symbols and the quantity of HE-LTF symbols is 5. When the value of the EHT-LTF symbol quantity field is 101, it indicates that the difference between the quantity of EHT-LTF symbols and the quantity of HE-LTF symbols is 6. When the value of the EHT-LTF symbol quantity field is 110, it indicates that the difference between the quantity of EHT-LTF symbols and the quantity of HE-LTF symbols is 7. When the value of the EHT-LTF symbol quantity field is 111, it indicates that the difference between the quantity of EHT-LTF symbols and the quantity of HE-LTF symbols is 8. It can be understood that, in this embodiment of this application, a correspondence between the value and a meaning of the EHT-LTF symbol quantity field is not limited, and there may alternatively be another mapping relationship.

If the quantity of EHT-LTF symbols is the same as the quantity of HE-LTF symbols, the trigger frame may not carry the indication information. If the quantity of EHT-LTF symbols is greater than the quantity of HE-LTF symbols, the trigger frame carries the indication information, and the indication information is used to indicate a quantity of symbols that is obtained by subtracting the quantity of HE-LTF symbols from the quantity of EHT-LTF symbols.

S303: The STA generates an EHT PPDU, where a quantity of EHT-LTF symbols in the EHT PPDU is equal to a sum of a quantity of HE-LTF symbols that is indicated by a number of HE-LTF Symbols and midamble periodicity field in the trigger frame and the quantity value indicated by the indication information.

S304: The STA sends the EHT PPDU.

Specifically, the indication information in the trigger frame indicates the difference between the quantity of EHT-LTF symbols and the quantity of HE-LTF symbols. The number of HE-LTF Symbols and midamble periodicity field in the trigger frame indicates the quantity of HE-LTF symbols. Therefore, after receiving the trigger frame, the STA may set, based on the indication information and the indication of the number of HE-LTF Symbols and midamble periodicity field in the trigger frame, a quantity of EHT-LTF symbols in the EHT PPDU to the sum of the quantity indicated by the indication information and the quantity indicated by the number of HE-LTF Symbols and midamble periodicity field. Therefore, the quantity of EHT-LTF symbols in the EHT PPDU generated by the STA is equal to the sum of the quantity of HE-LTF symbols that is indicated by the number of HE-LTF Symbols and midamble periodicity field in the trigger frame and the quantity value indicated by the indication information. After generating the EHT PPDU, the STA may send the generated EHT PPDU to the AP. After receiving the EHT PPDU, the AP may return an acknowledgment frame. The STA herein is a STA supporting the 802.11be protocol.

Optionally, a station supporting the 802.11ax protocol may also receive the foregoing trigger frame. After receiving the trigger frame, the station may set, based on the quantity of HE-LTF symbols that is indicated by the number of HE-LTF Symbols and midamble periodicity field in the trigger frame, a quantity of HE-LTF symbols in an HE TB PPDU to the quantity indicated by the number of HE-LTF Symbols and midamble periodicity field. After generating the HE TB PPDU, the station may send the generated HE TB PPDU to the AP. After receiving the HE TB PPDU, the AP may return an acknowledgment frame.

It can be understood that, the method in this embodiment of this application may be used to only schedule the station supporting the 802.11be protocol to send the uplink EHT PPDU, or may be used to simultaneously schedule the station supporting the 802.11be protocol to send the uplink EHT PPDU and schedule the station supporting the 802.11ax protocol to send the uplink HE TB PPDU.

It can be learned that, this embodiment of this application provides the indication of the quantity of EHT-LTF symbols, which is applicable to a scenario of hybrid transmission of the EHT PPDU and the HE TB PPDU. This can further improve the method for indicating an uplink parameter of a PPDU. In this embodiment of this application, a size of an EHT-LTF is further limited to being the same as a size of HE Data. In addition, a same guard interval length is used. This ensures symbol alignment and orthogonality between the HE TB PPDU and the EHT PPDU, thereby preventing adjacent-band interference.

In an optional embodiment, one to eight HE-LTF symbols are supported in the 802.11ax standard, and one to 16 EHT-LTF symbols are supported in the 802.11be standard. Therefore, when there are both an HE TB PPDU and an EHT PPDU in uplink transmission, to prevent adjacent-band interference resulting from non-orthogonality caused by misalignment between symbols, symbol alignment between the HE TB PPDU and the EHT PPDU needs to be performed. In a possible implementation, the AP generates and sends a trigger frame, where a number of HE-LTF Symbols and midamble periodicity field in the trigger frame are used to indicate a quantity of HE-LTF symbols and a quantity of EHT-LTF symbols. In this embodiment of this application, the quantity of HE-LTF symbols is the same as the quantity of EHT-LTF symbols. Therefore, the number of HE-LTF Symbols and midamble periodicity field in the trigger frame may indirectly indicate/implicitly indicate the quantity of EHT-LTF symbols. After receiving the trigger frame, the STA supporting the 802.11be protocol generates and sends an EHT PPDU, where a quantity of EHT-LTF symbols in the EHT PPDU is equal to the quantity indicated by the number of HE-LTF Symbols and midamble periodicity field in the trigger frame. In other words, for the HE TB PPDU and the EHT PPDU in this embodiment of this application, a same quantity of LTF symbols are transmitted (the 802.11ax standard supports a maximum of eight HE-LTF symbols, and therefore the quantity of LTF symbols herein cannot exceed 8), and a same LTF size (the size herein refers to a time length) and a same guard interval length may be used. Therefore, in a scenario of hybrid transmission of the HE TB PPDU and the EHT PPDU, an HE-LTF symbol quantity indication field and a guard interval and HE LTF size indication field in a trigger frame in 11ax may be used.

Optionally, the STA supporting the 802.11ax protocol may also receive the trigger frame, and generate and send an HE TB PPDU, where a quantity of HE-LTF symbols in the HE TB PPDU is equal to the quantity indicated by the number of HE-LTF Symbols and midamble periodicity field in the trigger frame.

It can be learned that, in this embodiment of this application, the trigger frame in flax is used to indirectly indicate/implicitly indicate the quantity of HE-LTF symbols, and the quantity of HE-LTF symbols is limited to being the same as the quantity of EHT-LTF symbols. In addition, the guard interval and HE LTF size indication field in the trigger frame in 11ax may be used. In this way, the implementation is simple, signaling overheads are low, and adjacent-band interference can be further prevented.

Embodiment 4

Embodiment 4 of this application mainly describes an EHT PPDU transmission method is mainly described, and specifically relates to a method for scheduling uplink transmission of an EHT SU PPDU and an EHT LPI SU PPDU. The EHT PPDU transmission method includes a method for scheduling uplink transmission of an EHT SU PPDU and an EHT LPI SU PPDU by using a trigger frame and a method for scheduling uplink transmission of an EHT SU PPDU and an EHT LPI SU PPDU through triggered response scheduling (triggered response scheduling, TRS).

It can be understood that, in actual application, Embodiment 4 of this application may be implemented in combination with any one, several, or all of Embodiment 1 to Embodiment 3. Embodiment 4 of this application may alternatively be separately implemented. This is not limited in this embodiment of this application.

It can be understood that, in the 802.11be standard, in addition to being triggered to send an EHT TB PPDU, the STA may be triggered to send an EHT SU PPDU. The EHT SU PPDU may also be referred to as an EHT MU PPDU (multiple user EHT PPDU, multiple user EHT PPDU) sent to a single user. A special EHT SU PPDU is further introduced in the 802.11be standard, is applicable to a 6 GHz LPI scenario, and is referred to as an EHT LPI SU PPDU.

Figure 12:
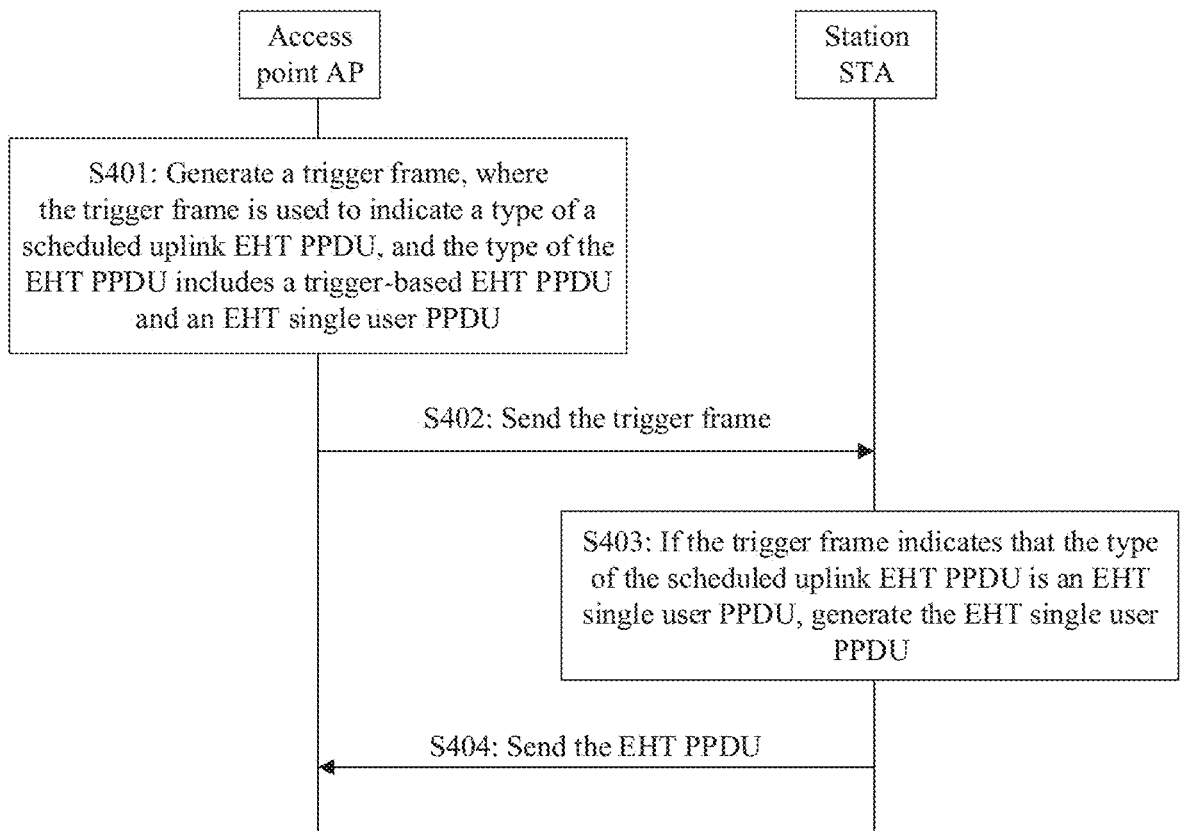
FIG. 12 is a schematic flowchart of a PPDU transmission method according to an embodiment of this application.

FIG. 12 is a schematic flowchart of a PPDU transmission method according to an embodiment of this application. The PPDU transmission method is described by using an example in which the method is implemented in a communications system including one AP and one or more STAs. The AP supports the IEEE 802.11be protocol (also referred to as Wi-Fi 7 or the EHT protocol), and the one or more STAs support the IEEE 802.11be protocol. It should be understood that, the AP and the STA in this embodiment of this application may further support a next-generation protocol of IEEE 802.11be. In other words, the PPDU transmission method provided in this embodiment of this application not only is applicable to the IEEE 802.11be protocol, but also is applicable to the next-generation protocol of IEEE 802.11be.

As shown in FIG. 12, the PPDU transmission method includes but is not limited to the following steps.

S401: The AP generates a trigger frame, where the trigger frame is used to indicate a type of a scheduled uplink EHT PPDU, and the type of the EHT PPDU includes a trigger-based EHT PPDU and an EHT single user PPDU.

S402: The AP sends the trigger frame. Correspondingly, the STA receives the trigger frame.

The type of the EHT PPDU may include a trigger-based EHT PPDU (which may be abbreviated as EHT TB PPDU), an EHT single user PPDU (which may be abbreviated as EHT SU PPDU), or a single user low power indoor EHT PPDU (which may be EHT SU LPI PPDU).

Figure 13:
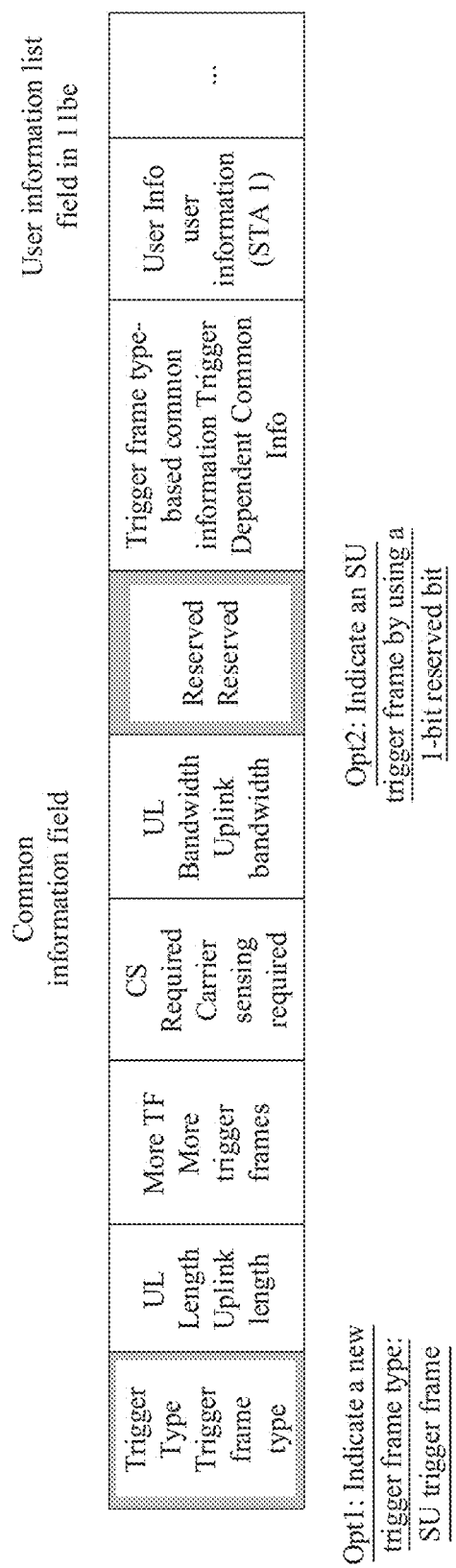
FIG. 13 is a schematic diagram of a frame format that is of a trigger frame and that is used to indicate scheduling of an EHT SU PPDU according to an embodiment of this application.

Specifically, to distinguish whether the trigger frame sent by the AP is used to trigger the EHT TB PPDU or the EHT SU PPDU, the trigger frame may carry indication information to indicate the type of the scheduled uplink EHT PPDU. In an implementation, a new trigger frame type is introduced into a trigger frame type field of the trigger frame to indicate that the type of the scheduled uplink EHT PPDU is an EHT SU PPDU. In another implementation, a 1-bit reserved bit in a common information field in the trigger frame is used to indicate whether the type of the scheduled uplink EHT PPDU is an EHT SU PPDU or an EHT TB PPDU. For example, when a value of the 1-bit reserved bit is 1, it indicates that the type of the scheduled uplink EHT PPDU is an EHT SU PPDU, and when the value of the 1-bit reserved bit is 0, it indicates that the type of the scheduled uplink EHT PPDU is an EHT TB PPDU. Alternatively, when the value of the 1-bit reserved bit is 0, it indicates that the type of the scheduled uplink EHT PPDU is an EHT SU PPDU, and when the value of the 1-bit reserved bit is 1, it indicates that the type of the scheduled uplink EHT PPDU is an EHT TB PPDU. FIG. 13 is a schematic diagram of a frame format that is of a trigger frame and that is used to indicate scheduling of an EHT SU PPDU according to an embodiment of this application. As shown in FIG. 13, opt1 indicates that the following new trigger frame type is indicated: an SU trigger frame, and opt2 indicates that an SU trigger frame is indicated by using a 1-bit reserved bit.

Figure 14:
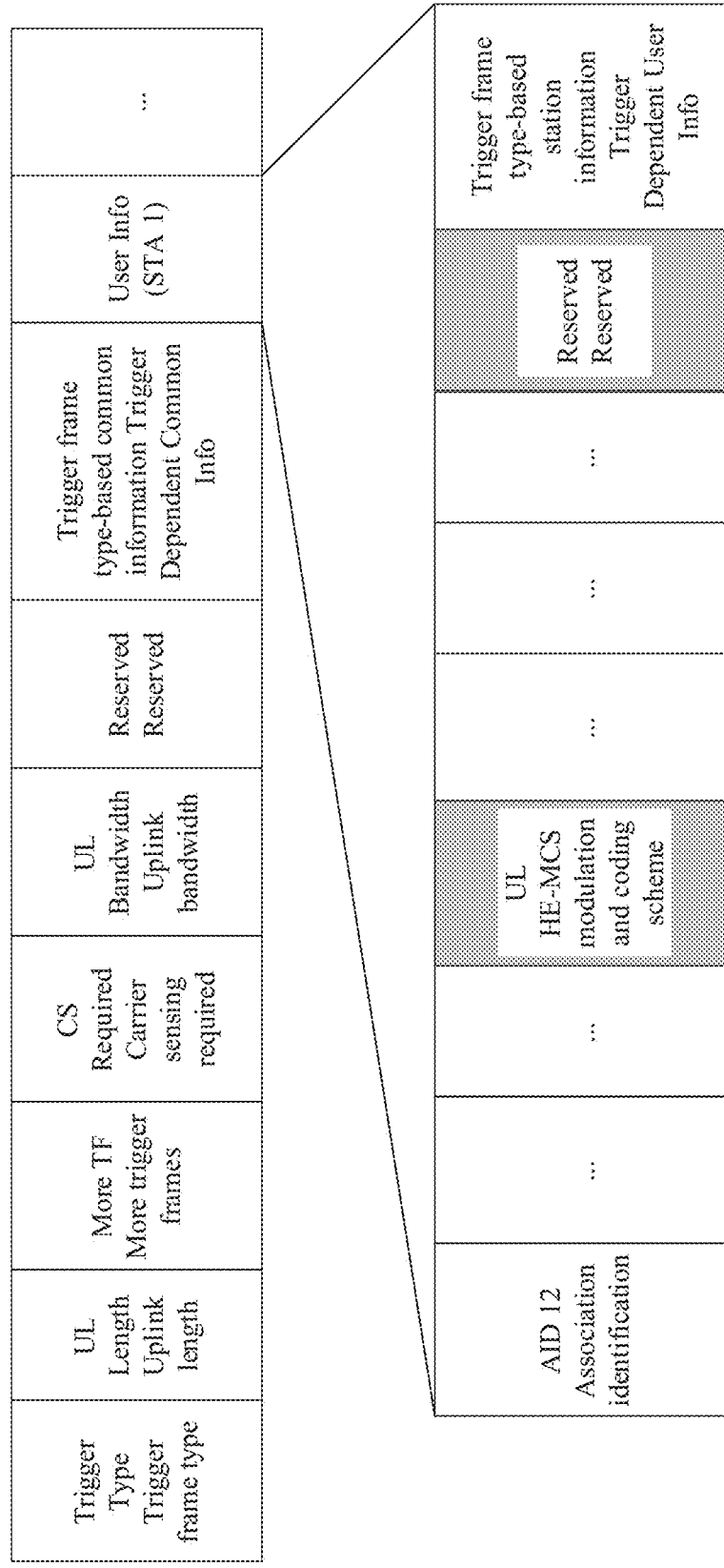
FIG. 14 is a schematic diagram of a frame format that is of a trigger frame and that is used to indicate scheduling of an EHT LPI SU PPDU according to an embodiment of this application.

Optionally, when the trigger frame indicates that the type of the scheduled uplink EHT PPDU is an EHT SU PPDU, whether the scheduled uplink EHT SU PPDU is an EHT LPI SU PPDU may be further indicated in the trigger frame. In other words, whether the scheduled uplink EHT SU PPDU is a common EHT SU PPDU or an EHT LPI SU PPDU may be further distinguished. In an implementation, a modulation and coding scheme (Modulation and Coding Scheme, MCS) field in an EHT user information field in the trigger frame is used to indicate whether the scheduled uplink EHT PPDU is an EHT LPI SU PPDU. For example, when the MCS field is MCS 15 (or may be another MCS value), it indicates that the scheduled uplink EHT PPDU is an EHT LPI SU PPDU. In another implementation, an extra 1 bit is used to indicate whether the scheduled uplink EHT PPDU is an EHT LPI SU PPDU. For example, a 1-bit reserved bit in a user information field (or an EHT user information field) in 11be in the trigger frame is used to indicate whether the scheduled uplink EHT PPDU is an EHT LPI SU PPDU. For example, when a value of the reserved bit is 1, it indicates that the scheduled uplink EHT PPDU is an EHT LPI SU PPDU. Alternatively, when the value of the reserved 1-bit is 0, it indicates that the scheduled uplink EHT PPDU is an EHT LPI SU PPDU. FIG. 14 is a schematic diagram of a frame format that is of a trigger frame and that is used to indicate scheduling of an EHT LPI SU PPDU according to an embodiment of this application. As shown in FIG. 14, opt1 indicates that an EHT LPI SU PPDU is indicated by using MCS 15, and opt2 indicates that an EHT LPI SU PPDU is indicated by using a 1-bit reserved bit.

Optionally, the foregoing implementation of indicating, by using the MCS field in the trigger frame, whether the scheduled uplink EHT PPDU is an EHT LPI SU PPDU may also be applicable to a non-triggering scenario. In the non-triggering scenario, the type of the EHT PPDU may be indicated by using EHT-SIG in the EHT PPDU. Specifically, an indication of the type of the EHT PPDU is located in an MCS indication field in a per-station field in EHT-SIG. For example, when the MCS field is MCS 15 (or may be another MCS value), it indicates that the EHT PPDU is an EHT LPI SU PPDU, and when the MCS field is another value, it indicates that the EHT PPDU is a common EHT SU PPDU.

It can be understood that, if the MCS field in the trigger frame is used to indicate whether the scheduled uplink EHT PPDU is an EHT LPI SU PPDU, because an EHT LPI SU PPDU may be considered as a special EHT SU PPDU, during triggering of a common EHT SU PPDU, the AP does not need to indicate an MCS, and the STA may select its own MCS. During triggering of the EHT LPI SU PPDU is triggered, this is equivalent to that the AP indicates the MCS to the STA.

S403: If the trigger frame indicates that the type of the scheduled uplink EHT PPDU is an EHT single user PPDU, the STA generates the EHT single user PPDU.

S404: The STA sends the EHT single user PPDU.

Specifically, the "STA" mentioned in this embodiment of this application is a station supporting the IEEE 802.11be protocol. After receiving the trigger frame, the STA may generate and send a corresponding EHT PPDU based on the type that is of the scheduled uplink EHT PPDU and that is indicated by the trigger frame. If the trigger frame indicates that the type of the scheduled uplink EHT PPDU is an EHT SU PPDU, the STA generates and sends the EHT SU PPDU. Optionally, if the trigger frame further indicates that the scheduled uplink EHT PPDU is an EHT LPI SU PPDU, the STA generates and sends the EHT LPI SU PPDU.

Optionally, when the trigger frame indicates that the scheduled uplink EHT PPDU is an EHT LPI SU PPDU, a bandwidth of the EHT LPI SU PPDU may be set to at least 80 MHz. Duplication transmission of a data part of the EHT LPI SU PPDU is performed in an upper half part and a lower half part of an entire frequency domain, and a dual carrier modulation technology and binary phase shift keying (Binary Phase Shift Keying, BPSK) modulation are respectively introduced in the upper half part and the lower half part of the entire frequency domain, to achieve an effect of duplicating a data bit four times and providing a power gain of six decibels.

It can be learned that, this embodiment of this application provides the method for scheduling uplink transmission of an EHT SU PPDU or an EHT LPI SU PPDU. In this embodiment of this application, uplink transmission of an EHT TB PPDU, an EHT SU PPDU, or an EHT LPI SU PPDU is mainly scheduled by using a trigger frame. This embodiment may be implemented in combination with the method for indicating an uplink parameter of a PPDU. In one trigger frame, not only an uplink parameter can be indicated, but also different types of EHT PPDUs can be scheduled, thereby reducing signaling overheads.

It should be understood that, the technical solutions described in Embodiment 1 to Embodiment 4 are all described by using a trigger frame in 11ax as an example. However, in actual application, the technical solutions described in Embodiment 1 to Embodiment 4 may alternatively be implemented by using a new MAC frame type or a new trigger frame type. For a manner of performing indication in the frame, refer to the manner of performing indication in the trigger frame in 11ax.

In an optional embodiment, not only an EHT SU PPDU and an EHT SU LPI PPDU are scheduled by using the foregoing trigger frame, but also an aggregated (Aggregated) control (A-control) variant in a high throughput (High Throughput, HT) control (HT control) field in a MAC frame header may be used to trigger the EHT SU PPDU or the EHT SU LPI PPDU.

Specifically, the AP may generate an A-control field, where the A-control field is used to indicate that a scheduled uplink EHT PPDU is an EHT SU PPDU or an EHT SU LPI PPDU. The AP sends the A-control field. Correspondingly, the STA receives the A-control field. If the A-control field is used to indicate that the scheduled uplink EHT PPDU is an EHT SU PPDU, the STA generates and sends the EHT SU PPDU. If the A-control field is used to indicate that the scheduled uplink EHT PPDU is an EHT SU LPI PPDU, the STA generates and sends the EHT SU LPI PPDU. In other words, if the A-control field indicates that the scheduled uplink EHT PPDU is a specific type of PPDU, the STA generates and sends this type of PPDU.

Figure 15:
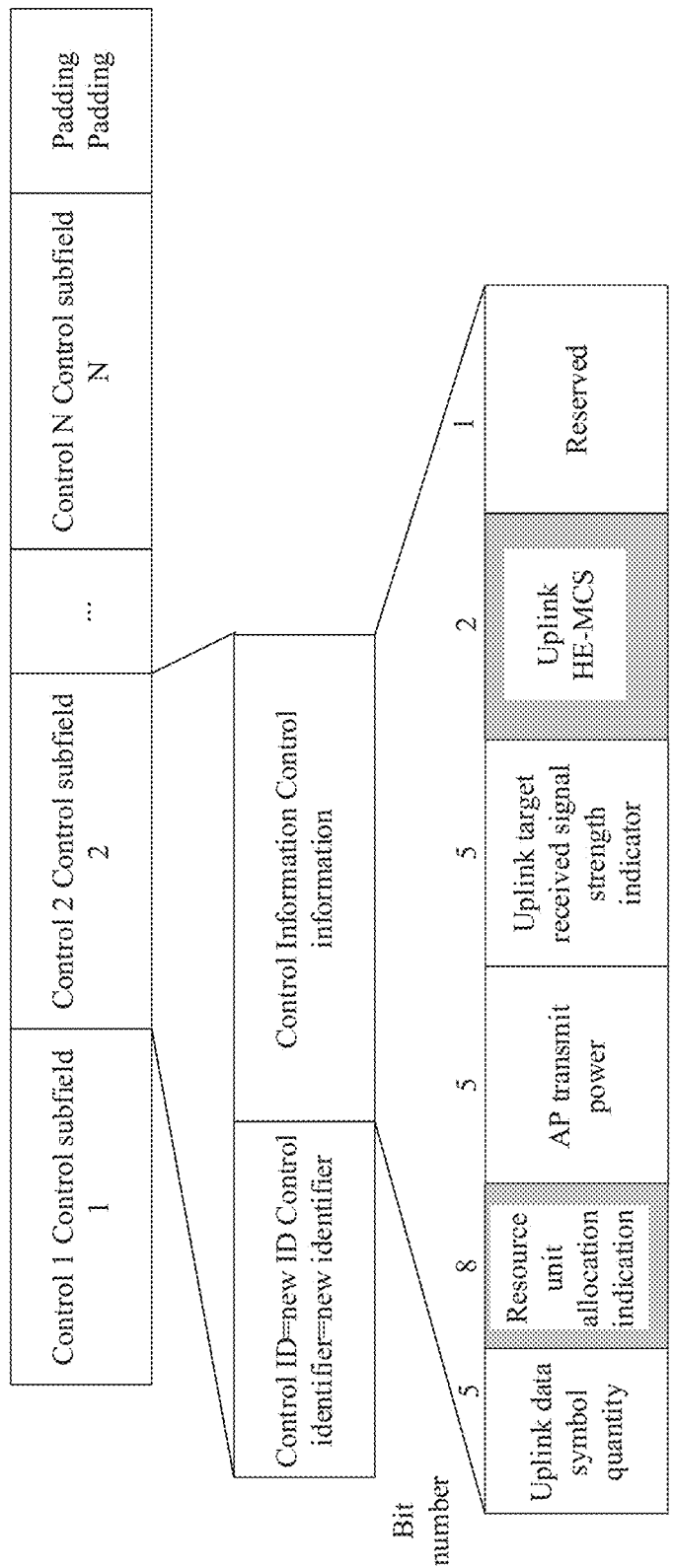
FIG. 15 is a schematic diagram of a frame format of an A-control subfield according to an embodiment of this application.

Optionally, a transmit end may transmit some control information by using an HT control field in a MAC frame header. An A-control subfield in a high efficient variant (variants of the HT control field include three forms: a high throughput variant, an extremely high throughput variant, and a high efficient variant) of the HT control field uses a structure including one or more control identifiers and control information, and may be used to carry one to N pieces of control information. FIG. 15 is a schematic diagram of a frame format of an A-control subfield according to an embodiment of this application. As shown in FIG. 15, the A-control subfield includes one to N control subfields and a padding (padding) field. Each control subfield includes a control identifier and control information. The control identifier may be used to indicate a type of the control information.

FIG. 15 also shows a frame format of a triggered response scheduling (triggered response scheduling, TRS) variant. The TRS variant is located in the control information in the control subfield. As shown in FIG. 15, the control information includes one or more of the following fields: an uplink data symbol quantity, a resource unit allocation indication, AP transmit power, an uplink target received signal strength indicator, an uplink HE-MCS (High Efficient Modulation and Coding Scheme, high efficient modulation and coding scheme, which may also be referred to as MCS for short), and a reserved field. The resource unit allocation indication field may be used to indicate a resource unit of an HE TB PPDU. Because resource unit allocation is not required for an EHT SU PPDU, a reserved index indication in the resource unit allocation indication field may be used to indicate that an EHT SU PPDU is scheduled. Optionally, another reserved index indication in the resource unit allocation indication field may be used to indicate that an EHT LPI SU PPDU is scheduled. Alternatively, a reserved uplink HE-MCS field is used to indicate that an EHT LPI SU PPDU is scheduled. For example, when a value of the uplink HE-MCS field is 00, it indicates that an EHT LPI SU PPDU is scheduled; and when the value of the uplink HE-MCS field is another value (01, 10, 11, or the like), it indicates that an EHT SU PPDU is scheduled.

As listed in Table 2 below, a resource unit allocation indication field includes a large quantity of reserved indexes.

TABLE 2

| RU Allocation (RU allocation) | Description | Entry quantity |
|---|---|---|
| \multicolumn{3}{l}{Resource unit allocation information in a trigger frame (lower seven bits)} | | |
| 0-36 | Possible 26-tone RU cases in 80 MHz (Possible 26-tone RU cases in 80 MHz) | 37 |
| 37-52 | Possible 52-tone RU cases in 80 MHz (Possible 52-tone RU cases in 80 MHz) | 16 |
| 53-60 | Possible 106-tone RU cases in 80 MHz (Possible 106-tone RU cases in 80 MHz) | 8 |
| 61-64 | Possible 242-tone RU cases in 80 MHz (Possible 242-tone RU cases in 80 MHz) | 4 |
| 65-66 | Possible 484-tone RU cases in 80 MHz (Possible 484-tone RU cases in 80 MHz) | 2 |
| 67 | 996-tone RU cases in 80 MHz (Possible 996-tone RU cases in 80 MHz) | 1 |

TABLE 2-continued

| RU Allocation (RU allocation) | Description | Entry quantity |
|---|---|---|
| \multicolumn{3}{l}{Resource unit allocation information in a trigger frame (lower seven bits)} | | |
| 68 | 2 × 996-tone RU case (2 × 996-tone RU case) | 1 |
| 69-127 | Reserved (reserved) | 59 |

When the uplink HE-MCS field is used to indicate whether an EHT LPI SU PPDU is scheduled, because an EHT LPI SU PPDU may be considered as a special EHT SU PPDU, during triggering of a common EHT SU PPDU, the AP does not need to indicate an MCS, and the STA may select its own MCS. During triggering of the EHT LPI SU PPDU is triggered, this is equivalent to that the AP indicates the MCS to the STA.

It can be learned that, in this embodiment of this application, the EHT SU PPDU or the EHT LPI SU PPDU are scheduled through TRS. In this way, a clear and specific meaning is achieved, and uplink transmission scheduling of different types of EHT PPDUs in 802.11be are implemented.

The method provided in this application is described in detail in the foregoing content. To better implement the foregoing solutions in the embodiments of this application, the embodiments of this application further provide a corresponding apparatus or device.

In the embodiments of this application, the AP and the STA may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software function module. It should be noted that, in embodiments of this application, division into the modules is an example, and is merely logical function division. During actual implementation, another division manner may be used. A communications apparatus in the embodiments of this application is described in detail below with reference to FIG. 16 to FIG. 18. The communications apparatus is an access point or a station. Further, the communications apparatus may be an apparatus in an AP. Alternatively, the communications apparatus is an apparatus in a STA.

Figure 16:
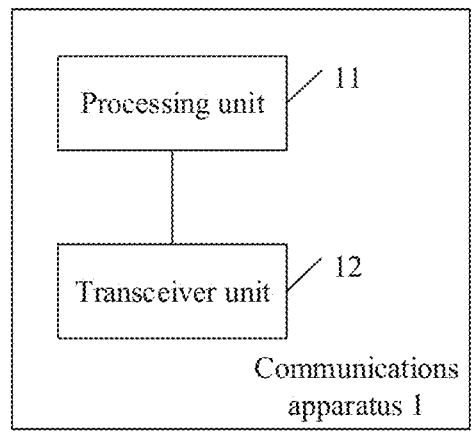
FIG. 16 is a schematic diagram of a structure of a communications apparatus 1 according to an embodiment of this application.

When an integrated unit is used, refer to FIG. 16. FIG. 16 is a schematic diagram of a structure of a communications apparatus 1 according to an embodiment of this application. The communications apparatus 1 may be an AP or a chip in an AP, for example, a Wi-Fi chip. As shown in FIG. 16, the communications apparatus 1 includes a processing unit 11 and a transceiver unit 12.

In a first design, the processing unit 11 is configured to generate a trigger frame, where the trigger frame includes an uplink length field, and the uplink length field is used to indicate lengths indicated by legacy signal L-SIG fields in a high efficient trigger based physical layer protocol data unit HE TB PPDU and an extremely high throughput physical layer protocol data unit EHT PPDU, or the uplink length field is used to indicate the length indicated by the L-SIG field in the EHT PPDU; and the transceiver unit 12 is configured to send the trigger frame.

Optionally, a length value indicated by the uplink length field is a positive integer and is a multiple of 3 minus 2.

Optionally, the transceiver unit 12 is further configured to receive the EHT PPDU from a STA, where the length indicated by the L-SIG field in the EHT PPDU is equal to the length value indicated by the uplink length field plus 2.

It can be learned that, in the communications apparatus 1, the trigger frame generated by the processing unit 11 includes the uplink length field, where the uplink length field is used to indicate the lengths indicated by the L-SIG fields in the EHT PPDU and the HE TB PPDU or indicate the length indicated by the L-SIG field in the EHT PPDU. In this way, both an EHT station and an HE station can be scheduled to perform uplink data transmission, thereby reducing instruction overheads. In addition, a trigger frame in 11ax is reused. This can avoid impact on receiving the trigger frame by the HE station and a method for setting the length indicated by the L-SIG field in the HE TB PPDU.

It should be understood that, the communications apparatus 1 in this design may correspondingly perform Embodiment 1, and the foregoing operations performed by the units in the communications apparatus 1 or the foregoing functions of the units are respectively used to implement corresponding operations performed by the AP in Embodiment 1. For brevity, details are not described herein again.

In a second design, the processing unit 11 is configured to generate a trigger frame, where a reserved bit in a common information field in the trigger frame and an HE uplink bandwidth field in the common information field jointly indicate an uplink bandwidth used for sending an EHT PPDU; or an EHT common information field in the trigger frame and an HE uplink bandwidth field in the common information field in a trigger frame jointly indicate an uplink bandwidth used for sending the EHT PPDU; and the transceiver unit 12 is configured to send, by the AP, the trigger frame. The HE uplink bandwidth field in the common information field in the trigger frame is used to indicate an uplink bandwidth used for sending an HE TB PPDU.

Optionally, a 1-bit reserved bit or 2-bit reserved bits in the common information field are used to indicate whether the uplink bandwidth used for sending the EHT PPDU is the same as the uplink bandwidth used for sending the HE TB PPDU. For example, when a value of the 1-bit reserved bit is 0, it indicates that the uplink bandwidth used for sending the EHT PPDU is the same as the uplink bandwidth used for sending the HE TB PPDU; and when the value of the 1-bit reserved bit is 1, it indicates that the uplink bandwidth used for sending the EHT PPDU is 320 MHz. For another example, when values of the 2-bit reserved bits are 00, it indicates that the uplink bandwidth used for sending the EHT PPDU is the same as the uplink bandwidth used for sending the HE TB PPDU; when the values of the 2-bit reserved bits are 01, it indicates that the uplink bandwidth used for sending the EHT PPDU is 320 MHz; and when the values of the 2-bit reserved bits are the other values 10 and 11, the 2-bit reserved bits indicate reserved. For another example, when the values of the 2-bit reserved bits are 00, it indicates that the uplink bandwidth used for sending the EHT PPDU is the same as the uplink bandwidth used for sending the HE TB PPDU; when the values of the 2-bit reserved bits are 01, it indicates that the uplink bandwidth used for sending the EHT PPDU is 160 MHz; when the values of the 2-bit reserved bits are 10, it indicates that the uplink bandwidth used for sending the EHT PPDU is 320 MHz; and when the values of the 2-bit reserved bits are the other values 11, the 2-bit reserved bits indicate reserved.

Optionally, the EHT common information field may include an EHT uplink bandwidth field, and the EHT uplink bandwidth field is used to indicate whether the uplink bandwidth used for sending the EHT PPDU is the same as the uplink bandwidth used for sending the HE TB PPDU. A length of the EHT uplink bandwidth field may be 1 bit or 2 bits.

It can be learned that, in the communications apparatus 1, based on reuse of an indication of the HE uplink bandwidth field in the trigger frame in 11ax, fewer bits are used to indicate the uplink bandwidth (that is, the EHT uplink bandwidth) used for sending the EHT PPDU. Compared with a manner in which 3 bits are directly used to indicate the uplink bandwidth used for sending the EHT PPDU, this manner reduces overheads.

It should be understood that, the communications apparatus 1 in this design may correspondingly perform Embodiment 2, and the foregoing operations performed by the units in the communications apparatus 1 or the foregoing functions of the units are respectively used to implement corresponding operations performed by the AP in Embodiment 2. For brevity, details are not described herein again.

In a third design, the processing unit 11 is configured to generate a trigger frame, where the trigger frame includes indication information, and the indication information is used to indicate a difference between a quantity of EHT-LTF symbols and a quantity of HE-LTF symbols; and the transceiver unit 12 is configured to send the trigger frame.

Optionally, a sum of quantities of EHT-LTF symbols and EHT data symbols is equal to a sum of quantities of HE-LTF symbols and HE data symbols.

Optionally, the indication information is carried in a reserved bit in a common information field in the trigger frame or is carried in an EHT common information field in the trigger frame.

Optionally, the transceiver unit 12 is further configured to receive an EHT PPDU from a STA, where a quantity of EHT-LTF symbols in the EHT PPDU is equal to a sum of a quantity of HE-LTF symbols that is indicated by a number of HE-LTF Symbols and midamble periodicity field in the trigger frame and the quantity value indicated by the indication information.

It should be understood that, the communications apparatus 1 in this design may correspondingly perform Embodiment 3, and the foregoing operations performed by the units in the communications apparatus 1 or the foregoing functions of the units are respectively used to implement corresponding operations performed by the AP in Embodiment 3. For brevity, details are not described herein again.

In a fourth design, the processing unit 11 is configured to generate a trigger frame, where the trigger frame is used to indicate a type of a scheduled uplink EHT PPDU, and the type of the EHT PPDU includes a trigger-based EHT PPDU and an EHT single user PPDU; and the transceiver unit 12 is configured to send the trigger frame.

Optionally, the type of the EHT PPDU is indicated by a trigger frame type field in the trigger frame or is indicated by a reserved bit in the trigger frame.

Optionally, the trigger frame is further used to indicate whether the scheduled uplink EHT PPDU is an EHT SU LPI PPDU.

Optionally, whether the scheduled uplink EHT PPDU is an EHT SU LPI PPDU is indicated by a modulation and coding scheme field in the trigger frame or is indicated by a reserved bit in an EHT user information field in the trigger frame.

It should be understood that, the communications apparatus 1 in this design may correspondingly perform Embodiment 4, and the foregoing operations performed by the units in the communications apparatus 1 or the foregoing functions of the units are respectively used to implement corresponding operations performed by the AP in Embodiment 4. For brevity, details are not described herein again.

Figure 17:
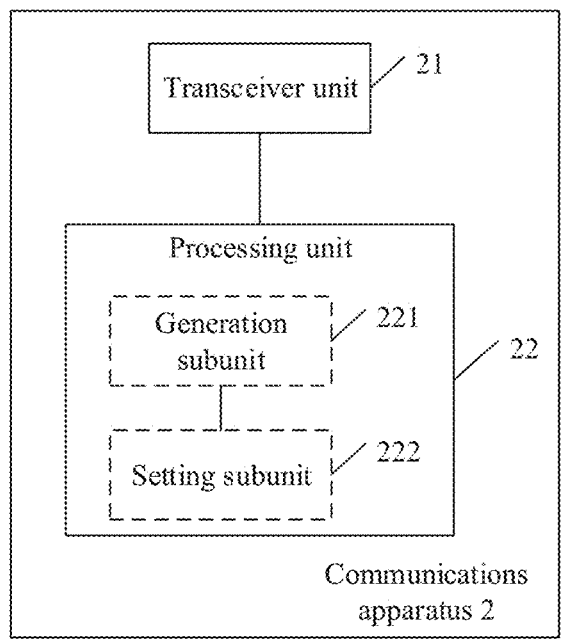
FIG. 17 is a schematic diagram of a structure of a communications apparatus 2 according to an embodiment of this application.

FIG. 17 is a schematic diagram of a structure of a communications apparatus 2 according to an embodiment of this application. The communications apparatus 2 may be a STA or a chip in a STA, for example, a Wi-Fi chip. As shown in FIG. 17, the communications apparatus 2 includes a transceiver unit 21 and a processing unit 22.

In a first design, the transceiver unit 21 is configured to receive a trigger frame, where the trigger frame includes an uplink length field, and the uplink length field is used to indicate lengths indicated by L-SIG fields in an HE TB PPDU and an EHT PPDU, or the uplink length field is used to indicate the length indicated by the L-SIG field in the EHT PPDU; and the processing unit 22 is configured to generate the EHT PPDU, where the length indicated by the L-SIG field in the EHT PPDU is equal to a length value indicated by the uplink length field plus 2. The transceiver unit 21 is further configured to send the generated EHT PPDU.

Optionally, the processing unit 22 may include a generation subunit 221 and a setting subunit 222. The generation subunit 221 is configured to generate the EHT PPDU. The setting subunit 222 is configured to set the length indicated by the L-SIG field in the EHT PPDU to the length value indicated by the uplink length field in the trigger frame plus 2. It can be understood that, in actual application, the processing unit 22 may include different subunits, configured to implement functions of the generation subunit 221 and the setting subunit 222. It can also be understood that, the functions of the generation subunit 221 and the setting subunit 222 may alternatively be implemented by one unit. This is not limited in this embodiment of this application.

Optionally, the length value indicated by the uplink length field is a positive integer and is a multiple of 3 minus 2.

It should be understood that, the communications apparatus 2 in this design may correspondingly perform Embodiment 1, and the foregoing operations performed by the units in the communications apparatus 2 or the foregoing functions of the units are respectively used to implement corresponding operations performed by the STA in Embodiment 1. For brevity, details are not described herein again.

In a second design, the transceiver unit 21 is configured to receive a trigger frame, where a reserved bit in a common information field in the trigger frame and an HE uplink bandwidth field in the common information field jointly indicate an uplink bandwidth used for sending an EHT PPDU; or an EHT common information field in the trigger frame and an HE uplink bandwidth field in a common information field in the trigger frame jointly indicate an uplink bandwidth used for sending the EHT PPDU; and the processing unit 22 is configured to generate the EHT PPDU. The transceiver unit 21 is further configured to send the EHT PPDU by using the uplink bandwidth indicated by the trigger frame. The HE uplink bandwidth field in the common information field in the trigger frame is used to indicate an uplink bandwidth used for sending an HE TB PPDU.

Optionally, a 1-bit reserved bit or 2-bit reserved bits in the common information field are used to indicate whether the uplink bandwidth used for sending the EHT PPDU is the same as the uplink bandwidth used for sending the HE TB PPDU.

Optionally, the EHT common information field may include an EHT uplink bandwidth field, and the EHT uplink bandwidth field is used to indicate whether the uplink bandwidth used for sending the EHT PPDU is the same as the uplink bandwidth used for sending the HE TB PPDU. A length of the EHT uplink bandwidth field may be 1 bit or 2 bits.

It should be understood that, the communications apparatus 2 in this design may correspondingly perform Embodiment 2, and the foregoing operations performed by the units in the communications apparatus 2 or the foregoing functions of the units are respectively used to implement corresponding operations performed by the STA in Embodiment 2. For brevity, details are not described herein again.

In a third design, the transceiver unit 21 is configured to receive a trigger frame, where the trigger frame includes indication information, and the indication information is used to indicate a difference between a quantity of EHT-LTF symbols and a quantity of HE-LTF symbols; and the processing unit 22 is configured to generate an EHT PPDU, where a quantity of EHT-LTF symbols in the EHT PPDU is equal to a sum of a quantity of HE-LTF symbols that is indicated by a number of HE-LTF Symbols and midamble periodicity field in the trigger frame and the quantity value indicated by the indication information. The transceiver unit 21 is further configured to send the EHT PPDU.

Optionally, the processing unit 22 may include a generation subunit 221 and a setting subunit 222. The generation subunit 221 is configured to generate an EHT PPDU. The setting subunit 222 is configured to set the quantity of EHT-LTF symbols in the EHT PPDU to the sum of the quantity of HE-LTF symbols that is indicated by the number of HE-LTF Symbols and midamble periodicity field in the trigger frame and the quantity value indicated by the indication information. It can be understood that, in actual application, the processing unit 22 may include different subunits, configured to implement functions of the generation subunit 221 and the setting subunit 222. It can also be understood that, the functions of the generation subunit 221 and the setting subunit 222 may alternatively be implemented by one unit. This is not limited in this embodiment of this application.

Optionally, a sum of quantities of EHT-LTF symbols and EHT data symbols is equal to a sum of quantities of HE-LTF symbols and HE data symbols.

Optionally, the indication information is carried in a reserved bit in a common information field in the trigger frame or is carried in an EHT common information field in the trigger frame.

It should be understood that, the communications apparatus 2 in this design may correspondingly perform Embodiment 3, and the foregoing operations performed by the units in the communications apparatus 2 or the foregoing functions of the units are respectively used to implement corresponding operations performed by the STA in Embodiment 3. For brevity, details are not described herein again.

In a fourth design, the transceiver unit 21 is configured to receive a trigger frame, where the trigger frame is used to indicate a type of a scheduled uplink EHT PPDU, and the type of the EHT PPDU includes a trigger-based EHT PPDU and an EHT single user PPDU; and the processing unit 22 is configured to: when the trigger frame indicates that the type of the scheduled uplink EHT PPDU is an EHT single user PPDU, generate the EHT single user PPDU. The transceiver unit 21 is further configured to send the EHT single user PPDU.

Optionally, the type of the EHT PPDU is indicated by a trigger frame type field in the trigger frame or is indicated by a reserved bit in the trigger frame.

Optionally, the trigger frame is further used to indicate whether the scheduled uplink EHT PPDU is an EHT SU LPI PPDU.

Optionally, whether the scheduled uplink EHT PPDU is an EHT SU LPI PPDU is indicated by a modulation and coding scheme field in the trigger frame or is indicated by a reserved bit in an EHT user information field in the trigger frame.

It should be understood that, the communications apparatus 2 in this design may correspondingly perform Embodiment 4, and the foregoing operations performed by the units in the communications apparatus 2 or the foregoing functions of the units are respectively used to implement corresponding operations performed by the STA in Embodiment 4. For brevity, details are not described herein again.

The foregoing describes the AP and the STA in the embodiments of this application, and the following describes possible product forms of the AP and the STA. It should be understood that, any product in any form that has a function of the AP shown in FIG. 16 and any product in any form that has a function of the STA shown in FIG. 17 fall within the protection scope of the embodiments of this application. It should be further understood that the following descriptions are merely examples, and product forms of the AP and the STA in the embodiments of this application are not limited thereto.

In a possible product form, the AP and the STA in the embodiments of this application each may be implemented by a general bus architecture.

Figure 18:
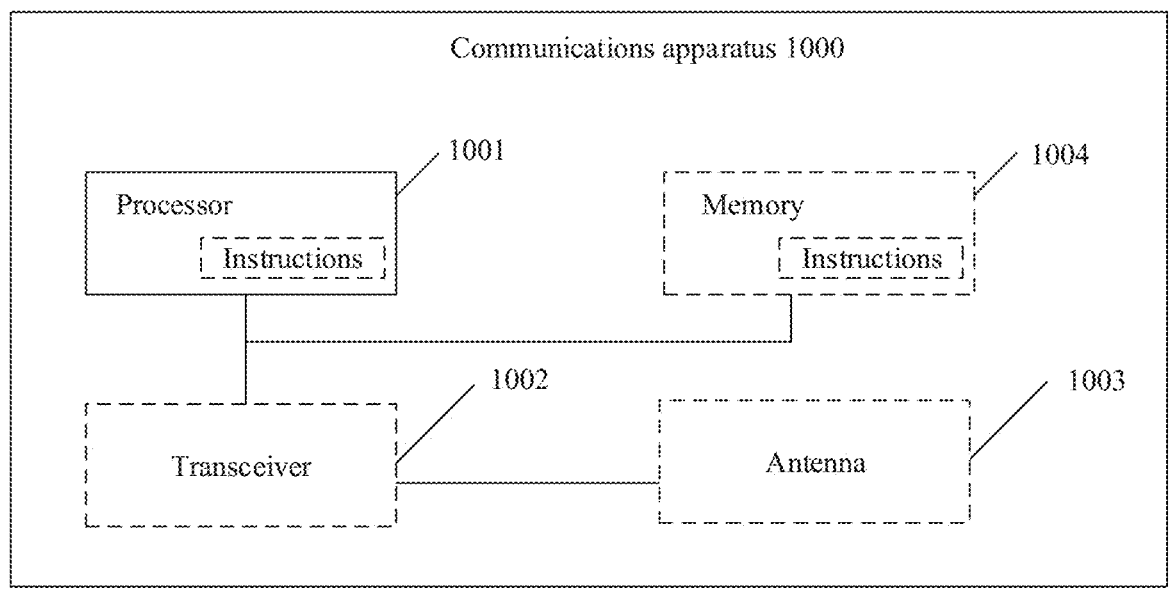
FIG. 18 is a schematic diagram of a structure of a communications apparatus 1000 according to an embodiment of this application.

FIG. 18 is a schematic diagram of a structure of a communications apparatus 1000 according to an embodiment of this application. The communications apparatus 1000 may be an AP MLD or a STA, or an apparatus therein. As shown in FIG. 18, the communications apparatus 1000 includes a processor 1001 and a transceiver 1002 that is internally connected and communicated with the processor. The processor 1001 is a general purpose processor, a dedicated processor, or the like. For example, the processor 1001 may be a baseband processor or a central processing unit. The baseband processor may be configured to process a communications protocol and communications data. The central processing unit may be configured to control a communications apparatus (for example, a base station, a baseband chip, a terminal, a terminal chip, a DU, or a CU), execute a software program, and process data of the software program. The transceiver 1002 may be referred to as a transceiver unit, a transceiver, a transceiver circuit, or the like, and is configured to implement a transceiver function. The transceiver 1002 may include a receiver and a transmitter. The receiver may be referred to as a receiver, a receiver circuit, or the like, and is configured to implement a receiving function. The transmitter may be referred to as a transmitter, a transmitter circuit, or the like, and is configured to implement a sending function. Optionally, the communications apparatus 1000 may further include an antenna 1003 and/or a radio frequency unit (not shown in the figure). The antenna 1003 and/or the radio frequency unit may be located inside the communications apparatus 1000, or may be separated from the communications apparatus 1000, in other words, the antenna 1003 and/or the radio frequency unit may be remotely deployed or deployed in a distributed manner.

Optionally, the communications apparatus 1000 may include one or more memories 1004. The memory 1004 may store instructions. The instructions may be a computer program. The computer program may be run on the communications apparatus 1000, so that the communications apparatus 1000 performs the method described in the foregoing method embodiments. Optionally, the memory 1004 may further store data. The communications apparatus 1000 and the memory 1004 may be disposed separately, or may be integrated together.

The processor 1001, the transceiver 1002, and the memory 1004 may be connected to each other by using a communications bus.

In a design, the communications apparatus 1000 may be configured to perform a function of the AP in Embodiment 1; the processor 1001 may be configured to perform step S101 in FIG. 6 and/or other processes of the technology described in this specification; and the transceiver 1002 may be configured to perform step S102 in FIG. 6 and/or other processes of the technology described in this specification.

In another design, the communications apparatus 1000 may be configured to perform a function of the STA in Embodiment 1; the processor 1001 may be configured to perform step S103 in FIG. 6 and/or other processes of the technology described in this specification; and the transceiver 1002 may be configured to perform step S104 in FIG. 6 and/or other processes of the technology described in this specification.

In a design, the communications apparatus 1000 may be configured to perform a function of the AP in Embodiment 2; the processor 1001 may be configured to perform step S201 in FIG. 7 and/or other processes of the technology described in this specification; and the transceiver 1002 may be configured to perform step S202 in FIG. 7 and/or other processes of the technology described in this specification.

In another design, the communications apparatus 1000 may be configured to perform a function of the STA in Embodiment 2; the processor 1001 may be configured to perform step S203 in FIG. 7 and/or other processes of the technology described in this specification; and the transceiver 1002 may be configured to perform step S204 in FIG. 7 and/or other processes of the technology described in this specification.

In a design, the communications apparatus 1000 may be configured to perform a function of the AP in Embodiment 3; the processor 1001 may be configured to perform step S301 in FIG. 9 and/or other processes of the technology described in this specification; and the transceiver 1002 may be configured to perform step S302 in FIG. 9 and/or other processes of the technology described in this specification.

In another design, the communications apparatus 1000 may be configured to perform a function of the STA in Embodiment 3; the processor 1001 may be configured to perform step S303 in FIG. 9 and/or other processes of the technology described in this specification; and the transceiver 1002 may be configured to perform step S304 in FIG. 9 and/or other processes of the technology described in this specification.

In a design, the communications apparatus 1000 may be configured to perform a function of the AP in Embodiment 4; the processor 1001 may be configured to perform step S401 in FIG. 12 and/or other processes of the technology described in this specification; and the transceiver 1002 may be configured to perform step S402 in FIG. 12 and/or other processes of the technology described in this specification.

In another design, the communications apparatus 1000 may be configured to perform a function of the STA in Embodiment 4; the processor 1001 may be configured to perform step S403 in FIG. 12 and/or other processes of the technology described in this specification; and the transceiver 1002 may be configured to perform step S404 in FIG. 12 and/or other processes of the technology described in this specification.

In any one of the foregoing designs, the processor 1001 may include a transceiver configured to implement receiving and sending functions. For example, the transceiver may be a transceiver circuit, an interface, or an interface circuit. The transceiver circuit, the interface, or the interface circuit configured to implement the receiving and sending functions may be separated, or may be integrated. The transceiver circuit, the interface, or the interface circuit may be configured to read and write code/data. Alternatively, the transceiver circuit, the interface, or the interface circuit may be configured to transmit or transfer a signal.

In any one of the foregoing designs, the processor 1001 may store instructions. The instructions may be a computer program. The computer program is run on the processor 1001, so that the communications apparatus 1000 can perform the method described in the foregoing method embodiments. The computer program may be configured in the processor 1000. In this case, the processor 1001 may be implemented by hardware.

In an implementation, the communications apparatus 1000 may include a circuit. The circuit may implement the sending, receiving, or communication function in the foregoing method embodiments. The processor and the transceiver that are described in this application may be implemented on an integrated circuit (integrated circuit, IC), an analog IC, a radio frequency integrated circuit RFIC, a hybrid signal IC, an application specific integrated circuit (application specific integrated circuit, ASIC), a printed circuit board (printed circuit board, PCB), an electronic device, or the like. The processor and the transceiver may alternatively be manufactured by using various IC technologies, for example, a complementary metal oxide semiconductor (complementary metal oxide semiconductor, CMOS), an N-type metal oxide semiconductor (nMetal-oxide-semiconductor, NMOS), a P-type metal oxide semiconductor (positive channel metal oxide semiconductor, PMOS), a bipolar junction transistor (bipolar junction transistor, BJT), a bipolar CMOS (BiCMOS), silicon germanium (SiGe), and gallium arsenide (GaAs).

A scope of the communications apparatus described in this application is not limited thereto, and a structure of the communications apparatus may not be limited in FIG. 18. The communications apparatus may be an independent device or a part of a large device. For example, the communications apparatus may be:

(1) an independent integrated circuit IC, a chip, or a chip system or subsystem;
(2) a set including one or more ICs, where optionally, the IC set may further include a storage component configured to store data and a computer program;
(3) an ASIC, for example, a modem (Modem);
(4) a module that can be embedded in another device;
(5) a receiver, a terminal, an intelligent terminal, a cellular phone, a wireless device, a handheld device, a mobile unit, a vehicle-mounted device, a network device, a cloud device, an artificial intelligence device, or the like; or
(6) others, or the like.

In a possible product form, the AP and the STA in the embodiments of this application each may be implemented by a general purpose processor.

A general purpose processor for implementing the AP includes a processing circuit and an input/output interface that is internally connected and communicated with the processing circuit.

In a design, the general purpose processor may be configured to perform the function of the AP in Embodiment 1. Specifically, the processing circuit is configured to perform step S101 in FIG. 6 and/or other processes of the technology described in this specification; and the input/output interface is configured to perform step S102 in FIG. 6 and/or other processes of the technology described in this specification.

In a design, the general purpose processor may be configured to perform the function of the AP in Embodiment 2. Specifically, the processing circuit is configured to perform step S201 in FIG. 7 and/or other processes of the technology described in this specification; and the input/output interface is configured to perform step S202 in FIG. 7 and/or other processes of the technology described in this specification.

In a design, the general purpose processor may be configured to perform the function of the AP in Embodiment 3. Specifically, the processing circuit is configured to perform step S301 in FIG. 9 and/or other processes of the technology described in this specification; and the input/output interface is configured to perform step S302 in FIG. 9 and/or other processes of the technology described in this specification.

In a design, the general purpose processor may be configured to perform the function of the AP in Embodiment 4. Specifically, the processing circuit is configured to perform step S401 in FIG. 12 and/or other processes of the technology described in this specification; and the input/output interface is configured to perform step S402 in FIG. 12 and/or other processes of the technology described in this specification.

A general purpose processor for implementing the STA includes a processing circuit and an input/output interface that is internally connected and communicated with the processing circuit.

In a design, the general purpose processor may be configured to perform the function of the STA in Embodiment 1. Specifically, the processing circuit is configured to perform step S103 in FIG. 6 and/or other processes of the technology described in this specification; and the input/output interface is configured to perform step S104 in FIG. 6 and/or other processes of the technology described in this specification.

In a design, the general purpose processor may be configured to perform the function of the STA in Embodiment 2. Specifically, the processing circuit is configured to perform step S203 in FIG. 7 and/or other processes of the technology described in this specification; and the input/output interface is configured to perform step S204 in FIG. 7 and/or other processes of the technology described in this specification.

In a design, the general purpose processor may be configured to perform the function of the STA in Embodiment 3. Specifically, the processing circuit is configured to perform step S303 in FIG. 9 and/or other processes of the technology described in this specification; and the input/output interface is configured to perform step S304 in FIG. 9 and/or other processes of the technology described in this specification.

In a design, the general purpose processor may be configured to perform the function of the STA in Embodiment 4. Specifically, the processing circuit is configured to perform step S403 in FIG. 12 and/or other processes of the technology described in this specification; and the input/ output interface is configured to perform step S404 in FIG. 12 and/or other processes of the technology described in this specification.

It should be understood that, the communications apparatuses in the foregoing product forms have any function of the AP or the STA in the foregoing method embodiments. Details thereof are not described herein again.

An embodiment of this application further provides a computer-readable storage medium. The computer-readable storage medium stores computer program code. When the processor executes the computer program code, an electronic device performs the method in any one of the foregoing embodiments.

An embodiment of this application further provides a computer program product. When the computer program product runs on a computer, the computer is enabled to perform the method in any one of the foregoing embodiments.

An embodiment of this application further provides a communications apparatus. The apparatus may exist in a product form of a chip. A structure of the apparatus includes a processor and an interface circuit. The processor is configured to communicate with another apparatus through a receiving circuit, to enable the apparatus to perform the method in any one of the foregoing embodiments.

An embodiment of this application further provides a wireless communications system, including an AP and a STA. The AP and the STA may perform the method in any one of the foregoing embodiments.

The method or algorithm steps described with reference to the content disclosed in this application may be implemented by hardware, or may be implemented by a processor by executing software instructions. The software instructions may include a corresponding software module. The software module may be stored in a random access memory (Random Access Memory, RAM), a flash memory, an erasable programmable read-only memory (Erasable Programmable ROM, EPROM), an electrically erasable programmable read-only memory (Electrically EPROM, EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in an interface device of a core network. Certainly, the processor and the storage medium may alternatively exist in the interface device of the core network as discrete components.

A person skilled in the art should be aware that in one or more of the foregoing examples, the functions described in this application may be implemented by using hardware, software, firmware, or any combination thereof. When the functions are implemented by software, the foregoing functions may be stored in a computer-readable medium or transmitted as one or more instructions or code in a computer-readable medium. The computer-readable medium includes a computer-readable storage medium and a communications medium. The communications medium includes any medium that facilitates transmission of a computer program from one place to another. The storage medium may be any available medium accessible to a general-purpose or dedicated computer.

The objectives, the technical solutions, and the benefits of this application are further described in detail in the foregoing specific implementations. It should be understood that the foregoing descriptions are merely specific implementations of this application, but are not intended to limit the protection scope of this application. Any modification, equivalent replacement, improvement, or the like made based on the technical solutions of this application shall fall within the protection scope of this application.

What is claimed is:

1. A communication method, comprising:
   generating, by an access point (AP), a trigger frame, wherein the trigger frame comprises an uplink length field, and the uplink length field is used to indicate lengths indicated by legacy signal (L-SIG) fields in a high efficient trigger based physical layer protocol data unit (HE TB PPDU) and an extremely high throughput physical layer protocol data unit (EHT PPDU), or the uplink length field is used to indicate a length indicated by an L-SIG field in an EHT PPDU;
   sending, by the AP, the trigger frame; and
   determining, by the AP, a received PPDU is an EHT PPDU according to a length indicated in an L-SIG field in the received PPDU is a multiple of three.

2. The method according to claim 1, wherein a length value indicated by the uplink length field is a positive integer and is a multiple of 3 minus 2.

3. The method according to claim 1, wherein:
   a reserved bit in a common information field in the trigger frame and an HE uplink bandwidth field in the common information field jointly indicate an uplink bandwidth used for sending the EHT PPDU; or
   an EHT common information field in the trigger frame and an HE uplink bandwidth field in a common information field in the trigger frame jointly indicate an uplink bandwidth used for sending the EHT PPDU.

4. The method according to claim 1, wherein the trigger frame further comprises indication information, and the indication information is used to indicate a difference between a quantity of EHT-LTF symbols and a quantity of HE-LTF symbols.

5. The method according to claim 1, wherein a sum of quantities of EHT-LTF symbols and EHT data symbols of the EHT PPDU is equal to a sum of quantities of HE-LTF symbols and HE data symbols of the HE TB PPDU.

6. The method according to claim 4, wherein the indication information is carried in a reserved bit in a common information field in the trigger frame or is carried in an EHT common information field in the trigger frame.

7. The method according to claim 1, wherein the trigger frame is further used to indicate a type of the EHT PPDU, and the type of the EHT PPDU comprises a EHT trigger-based PPDU and an EHT single user PPDU.

8. The method according to claim 7, wherein the type of the EHT PPDU is indicated by a trigger frame type field in the trigger frame or is indicated by a reserved bit in the trigger frame.

9. The method according to claim 7, wherein the trigger frame indicates that the type of the EHT PPDU is an EHT single user PPDU; and the trigger frame is further used to indicate whether the EHT PPDU is an EHT single user low power indoor (SU LPI) PPDU.

10. The method according to claim 9, wherein whether the EHT PPDU is an EHT SU LPI PPDU is indicated by a modulation and coding scheme field in the trigger frame or is indicated by a reserved bit in an EHT user information field in the trigger frame.

11. A method, comprising:
- receiving, by a station (STA), a trigger frame, wherein the trigger frame comprises an uplink length field, and the uplink length field is used to indicate lengths indicated by L-SIG fields in an RE TB PPDU and an EHT PPDU, or the uplink length field is used to indicate a length indicated by an L-SIG field in an EHT PPDU;
- generating, by the STA, the EHT PPDU, wherein a length indicated by the L-SIG field in the EHT PPDU is equal to a length value indicated by the uplink length field plus 2; and
- sending, by the STA, the EHT PPDU.

12. The method according to claim 11, wherein the length value indicated by the uplink length field is a positive integer and is a multiple of 3 minus 2.

13. The method according to claim 11, wherein a reserved bit in a common information field in the trigger frame and an HE uplink bandwidth field in the common information field jointly indicate an uplink bandwidth used for sending the EHT PPDU; or an EHT common information field in the trigger frame and an HE uplink bandwidth field in a common information field in the trigger frame jointly indicate an uplink bandwidth used for sending the EHT PPDU.

14. An apparatus, comprising:
- at least one processor coupled to at least one non-transitory memory storing programming instructions for execution by the at least one processor to perform operations comprising:
- generating a trigger frame, wherein the trigger frame comprises an uplink length field, and the uplink length field is used to indicate lengths indicated by legacy signal (L-SIG) fields in a high efficient trigger based physical layer protocol data unit (HE TB PPDU) and an extremely high throughput physical layer protocol data unit (EHT PPDU), or the uplink length field is used to indicate a length indicated by an L-SIG field in an EHT PPDU;
- sending the trigger frame; and
- determine a received PPDU is an EHT PPDU according to a length indicated in an L-SIG field in the received PPDU is a multiple of three.

15. The apparatus according to claim 14, wherein a length value indicated by the uplink length field is a positive integer and is a multiple of 3 minus 2.

16. An apparatus, comprising:
- at least one processor coupled to at least one non-transitory memory storing programming instructions for execution by the at least one processor to perform operations comprising:
- receiving a trigger frame, wherein the trigger frame comprises an uplink length field, and the uplink length field is used to indicate lengths indicated by L-SIG fields in an HE TB PPDU and an EHT PPDU, or the uplink length field is used to indicate a length indicated by an L-SIG field in an EHT PPDU;
- generating the EHT PPDU, wherein a length indicated by the L-SIG field in the EHT PPDU is equal to a length value indicated by the uplink length field plus 2; and
- sending the EHT PPDU.

17. The apparatus according to claim 16, wherein the length value indicated by the uplink length field is a positive integer and is a multiple of 3 minus 2.

18. The apparatus according to claim 16, wherein a reserved bit in a common information field in the trigger frame and an HE uplink bandwidth field in the common information field jointly indicate an uplink bandwidth used for sending the EHT PPDU; or an EHT common information field in the trigger frame and an HE uplink bandwidth field in a common information field in the trigger frame jointly indicate an uplink bandwidth used for sending the EHT PPDU.

19. The apparatus according to claim 14, wherein a reserved bit in a common information field in the trigger frame and an HE uplink bandwidth field in the common information field jointly indicate an uplink bandwidth used for sending the EHT PPDU; or an EHT common information field in the trigger frame and an HE uplink bandwidth field in a common information field in the trigger frame jointly indicate an uplink bandwidth used for sending the EHT PPDU.

* * * * *